(12) United States Patent
Wakabayashi

(10) Patent No.: US 12,166,893 B2
(45) Date of Patent: Dec. 10, 2024

(54) COMMUNICATION NETWORK NODE, METHODS, AND A MOBILE TERMINAL

(71) Applicant: Sony Group Corporation, Tokyo (JP)

(72) Inventor: Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 442 days.

(21) Appl. No.: 17/311,359

(22) PCT Filed: Dec. 12, 2019

(86) PCT No.: PCT/EP2019/084886
§ 371 (c)(1),
(2) Date: Jun. 7, 2021

(87) PCT Pub. No.: WO2020/120672
PCT Pub. Date: Jun. 18, 2020

(65) Prior Publication Data
US 2022/0029813 A1    Jan. 27, 2022

(30) Foreign Application Priority Data
Dec. 14, 2018  (EP) ..................................... 18212793

(51) Int. Cl.
*H04L 9/32* (2006.01)
*G06Q 20/32* (2012.01)
(Continued)

(52) U.S. Cl.
CPC ....... *H04L 9/3236* (2013.01); *G06Q 20/3223* (2013.01); *H04L 9/0618* (2013.01);
(Continued)

(58) Field of Classification Search
CPC ....... H04L 9/50; H04L 63/0861; G06Q 20/06; G06Q 20/223
See application file for complete search history.

(56) References Cited

U.S. PATENT DOCUMENTS 10,521,780 B1 *  12/2019  Hopkins, III .......... G06Q 20/12
10,776,879 B1 *  9/2020   Floyd ...................... G06F 16/27
(Continued)

FOREIGN PATENT DOCUMENTS

CN    107924389 A    4/2018
JP    2017157262 A   9/2017
(Continued)

OTHER PUBLICATIONS

Certificate_authority, Wikipedia, https://en.wikipedia.org/wiki/Certificate_authority, Dec. 17, 2018, 10 pages.
(Continued)

*Primary Examiner* — Ellen Tran
(74) *Attorney, Agent, or Firm* — XSENSUS LLP

(57) ABSTRACT

The present disclosure provides a communication network node for providing data to a distributed ledger, wherein the node has circuitry configured to perform at least one of provide verification of input data which is used as input to a smart contract, provide verification whether output data, which is based on an output from a smart contract, is correctly received at a predetermined dev.

18 Claims, 13 Drawing Sheets

(51) Int. Cl.
H04L 9/06 (2006.01)
H04L 9/08 (2006.01)
G06Q 20/06 (2012.01)
G06Q 20/22 (2012.01)
H04L 9/00 (2022.01)
H04L 9/40 (2022.01)

(52) U.S. Cl.
CPC .......... *H04L 9/0866* (2013.01); *H04L 9/3247* (2013.01); *G06Q 20/06* (2013.01); *G06Q 20/223* (2013.01); *G06Q 2220/00* (2013.01); *H04L 9/50* (2022.05); *H04L 63/0861* (2013.01); *H04L 2209/56* (2013.01)

(56) References Cited

U.S. PATENT DOCUMENTS

| | | | | |
|---|---|---|---|---|
| 10,826,685 | B1* | 11/2020 | Campagna | H04L 9/3247 |
| 10,832,335 | B1* | 11/2020 | Floyd | G06Q 30/0611 |
| 2013/0174241 | A1* | 7/2013 | Cha | H04L 63/0815 726/7 |
| 2015/0113592 | A1* | 4/2015 | Curtis | H04W 12/04 726/2 |
| 2015/0113599 | A1* | 4/2015 | Curtis | H04L 63/0428 726/4 |
| 2015/0113627 | A1* | 4/2015 | Curtis | H04L 63/08 726/10 |
| 2016/0072808 | A1* | 3/2016 | David | H04L 63/126 713/158 |
| 2017/0140408 | A1 | 5/2017 | Wuehler | |
| 2018/0139056 | A1 | 5/2018 | Imai | |
| 2020/0145219 | A1* | 5/2020 | Sebastian | G06F 21/32 |

FOREIGN PATENT DOCUMENTS

| | | |
|---|---|---|
| WO | WO-2018217788 A1 | 11/2018 |
| WO | 2019/121419 A1 | 6/2019 |
| WO | 2020/064545 A1 | 4/2020 |
| WO | 2020/083822 A1 | 4/2020 |

OTHER PUBLICATIONS

Data integrity, Wikipedia, https://en.wikipedia.org/w/index.php?title=Data_integrity&oldid=864124288, Apr. 19, 2021.
Side-channel Attack—Wikipedia, https://en.wikipedia.org/wiki/Side-channel_attack Dec. 17, 2018.
Smart contract, Wikipedia, https://en.wikipedia.org/w/index.php?title=Smart_contract&oldid=869532500, Apr. 19, 2021.
Anni Karinsalo and Kimmo Halunen, "Smart Contracts for a Mobility-as-a-Service Ecosystem", VTT Technical Research Centre of Finland Ltd, 2018 IEEE International Conference on Software Quality, Reliability and Security Companion.
Spoofing attack, Wikipedia, https://en.wikipedia.org/wiki/Spoofing_attack, Dec. 17, 2018.
Transit pass, Wikipedia, https://en.wikipedia.org/w/index.php?title=Transit_pass&oldid=870606428, Apr. 19, 2021.
"What are public, private and hybrid clouds?", Free account (https://azure.microsoft.com/en-gb/free/).
What is a blockchain oracle?, https://blog.apla.io/what-is-a-blockchain-oracle-2ccca433c026 Dec. 14, 2018.
Zero-knowledge proof, Wikipedia, https://en.wikipedia.org/wiki/Zero-knowledge_proof, Dec. 17, 2018.
International Search Report and Written Opinion mailed on Mar. 20, 2020, received for PCT Application PCT/EP2019/084886, filed on Dec. 12, 2019, 14 pages including English Translation.
Victor et al., "Geofences on the Blockchain: Enabling Decentralized Location-Based Services", IEEE International Conference on Data Mining Workshops, Nov. 17, 2018, pp. 97-104.
Buterin, "A Next Generation Smart Contract & Decentralized Application Platform", Ethereum White Paper, Facts & Figures 2009, Available Online At: https://cryptorating.eu/whitepapers/Ethereum/Ethereum_white_paper.pdf, Jan. 1, 2010, pp. 1-36.
Sabetti, "Mobile Identity Authentication", A Secure Technology Alliance Mobile Council White Paper, Version 1.0, Available Online at: https://www.securetechalliance.org/wp-content/uploads/Mobile-Identity-Authentication-WP-FINAL-March-2017.pdf, Mar. 2017, pp. 1-39.
Zhou Xiaoyuan, Tianjin People Press, The Blockchain Era What Digital Currency Means,20181130, pp. 218-219.
Philippe Crist: "Blockchain and Beyond Encoding 21 st Century Transport" Corporate Partnership Board Report Corporate Partnership Board CPB, May 17, 2018 (May 17, 2018), pp. 1-63, XP055646428,Retrieved from the Internet:URL :https ://www.itf-oecd.org/sites/defau lt/fi l es/docs/blockchain-and-beyondencoding-21 st-century-transport.pdf [retrieved on Nov. 26, 2019].
Secure Technology Alliance "A Secure Technology Alliance Mobile Council White Paper Mobile Identity Authentication",,Mar. 31, 2017 (Mar. 31, 2017), XP055675492.
Vitalik Buterin: "Facts & Figures 2009, Recurring Feature;2010 SRI C8052-13.410.1",, Jan. 1, 2010 (Jan. 1, 2010), XP055491222.
Incomcom Inc., "MaaS$^x$ Block Chain", Incomon New York, No. 353 (Sep. 2018); InfoCom Research [On-line], Jan. 29, 2018.
Xiwei Xu, et al., "The Blockchain as a Software Connector", 2016 13th Working IEEE/IFIP Conference on Software Architecture, U.S., IEEE, Apr. 2016, and pp. 182-191.
Tetsu, et al., "Proposal of Iot system with Smart Contract", Consumer Devices and Systems (CDS) [online], Japan, Information Processing Society, Jan. 24, 2018.p. 1-8, pp. 05.
Takeshi, The keys to settlement-of-accounts expansion are a future image of the pay by card seen in the "fusion with service", Special Report 1, automobile field, CardWave, and Japan an incorporated company card wave, Feb. 25, 2016, 29th volume No. 1, pp. 32-35.

* cited by examiner

COMMUNICATION NETWORK NODE, METHODS, AND A MOBILE TERMINAL

CROSS-REFERENCE TO RELATED APPLICATIONS

The present application is based on PCT filing PCT/EP2019/084886, filed Dec. 12, 2019, which claims priority to EP 18212793.6, filed Dec. 14, 2018, the entire contents of each are incorporated herein by reference.

TECHNICAL FIELD

The present disclosure generally pertains to a communication network node, a method for operating a smart contract, a method for controlling a communication network, and a mobile terminal.

TECHNICAL BACKGROUND

Generally, it is known to distribute a ledger over multiple nodes such as entities, e.g. electronic devices, servers or the like, which record digital transactions. Distributed ledgers can be based on the known blockchain technology, on which, for example, the known cryptocurrency bitcoin is based, but also the well-known Ethereum project, etc. Generally, a distributed ledger may also be implemented on other technologies than the blockchain technology and examples of distributed ledger projects which are not based on blockchain are BigchainDB and IOTA or the like. For instance, IOTA is a crypto currency which uses linked lists.

Moreover, mobility as a service (MaaS) is known, where a user or passenger uses mobility as a service without owing, for example, a car or the like. Mobility as a service may combine public (e.g. train, bus, etc.) and private (e.g. car sharing, bicycle sharing, etc.) transportation services from associated operators or providers.

Known MaaS solutions typically involve a central and unified gateway through which a trip or journey is planned and booked, wherein a user may pay with a single account.

Although there exist techniques for providing a distributed ledger and mobility as a service and associated communication, it is generally desirable to provide a communication network node, a method for operating a smart contract, and a method for controlling a communication network for providing a distributed ledger.

SUMMARY

According to a first aspect, the disclosure provides a communication network node for providing data to a distributed ledger, wherein the node comprises circuitry configured to perform at least one of provide verification of input data which is used as input to a smart contract, provide verification whether output data, which is based on an output from a smart contract, is correctly received at a predetermined device.

According to a second aspect, the disclosure provides a method for operating a smart contract, wherein the smart contract has at least two different states, the method comprising changing a state of the smart contract in response to receiving a trigger.

According to a third aspect, the disclosure provides a method for controlling a communication network comprising multiple nodes for providing a distributed ledger, the method comprising at least one of providing verification of input data which is used as input to a smart contract, providing verification whether output data, which is based on an output from a smart contract, is correctly received at a predetermined device.

According to a fourth aspect, the disclosure provides a mobile terminal for communicating with a network node for providing data to a distributed ledger, wherein the mobile terminal comprises circuitry configured to provide input data which is used as input to a smart contract.

Further aspects are set forth in the dependent claims, the following description and the drawings.

BRIEF DESCRIPTION OF THE DRAWINGS

Embodiments are explained by way of example with respect to the accompanying drawings, in which:

FIG. 10 illustrates a flowchart of an embodiment of a method of a location-based check-in;

FIG. 11 illustrates a flowchart of an embodiment of a method of a biometric-based check-in;

DETAILED DESCRIPTION OF EMBODIMENTS

Figure 1:
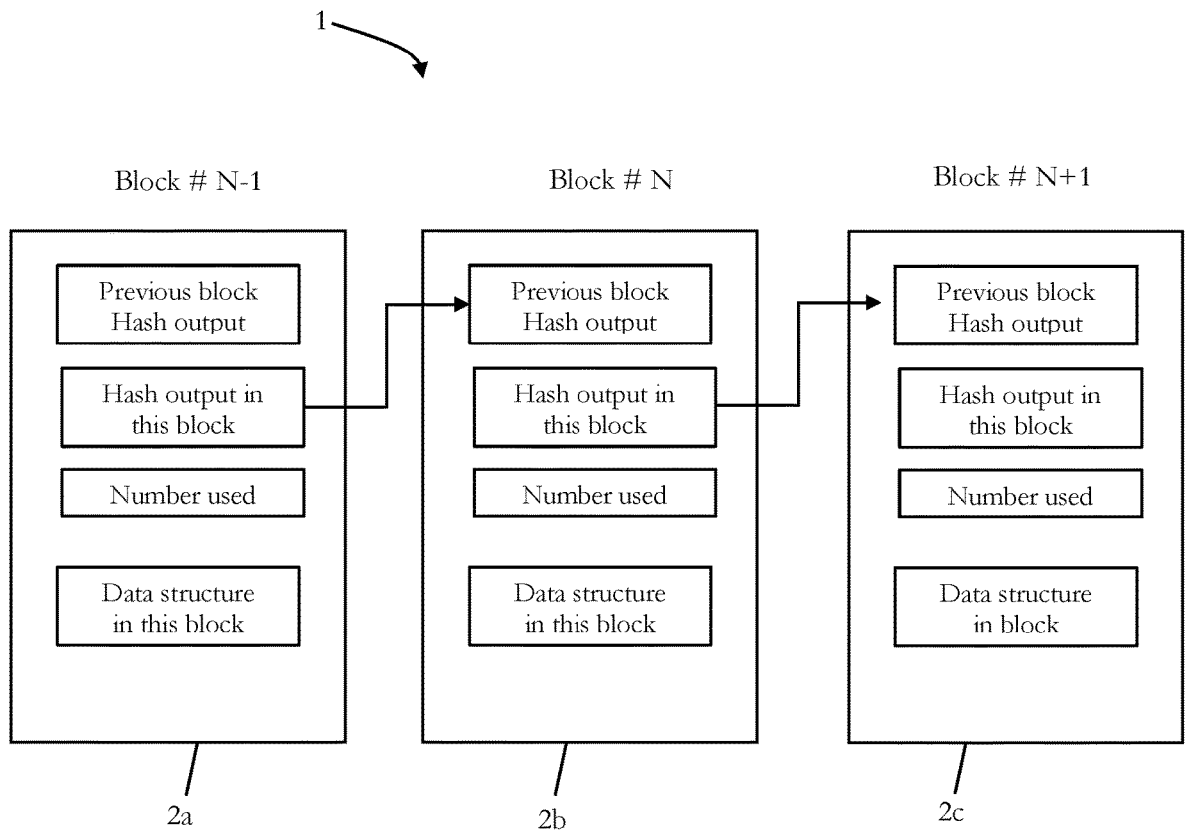
FIG. 1 schematically illustrates a blockchain.

Before a detailed description of the embodiments under reference of FIG. 1 is given, general explanations are made.

As mentioned in the outset, generally, distributed ledgers and mobility as a service (MaaS) are known.

The present disclosure pertains generally in some embodiments or aspects to the application of blockchains/distributed ledger for mobility as a service (MaaS) application, in particular MaaS among more than one service provider (multi-modal transports).

The present disclosure also generally pertains in some embodiments or aspects to the application of a distributed ledger or blockchain as one example for a distributed ledger, without limiting the present disclosure to blockchains. Distributed ledgers or blockchains are recognized to be suitable for Mobility as a service (MaaS) applications according to some aspects of the present disclosure, since a distributed ledger requires a distributed database for journey history (or journey data) among multi-players, i.e. multiple mobility as a service providers.

The technology of a distributed ledger and of a special example of it, namely of a blockchain, will also be discussed further below. More generally, the term distributed ledger is used as a type of database shared digitally recorded data with multiple nodes of a network. It may be comprised of peer to peer network. The digitally recorded data may include a kind of information to prove its consistency from the previously recorded data on the same database.

Distributed ledgers can be public and can be accessible by anyone, but, in principle, they can also be non-public and only users having a permission may have access to them, wherein a group of entities, nodes, persons, operators, providers or the like which have the permission may also referred to as "consortium", as will also be explained further below. It is also possible to differentiate the access permission to data on a ledger from each layered users.

Distributed ledgers can use mechanisms, which are known, for example, from the blockchain technology as used for bitcoin. Such mechanisms include a discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

In a distributed ledger or blockchain, a confirmation process to make a consensus about data renewal on a blockchain in attending nodes, called a mining process, may achieve irreversibility of the sequence of transactions recorded on the blockchain by including previous recorded data in the confirming data. Such mining process implements a distributed timestamp server for a new block of transactions. In bitcoin (and, thus, in some embodiments) the mining process is based on the SHA-256 hash function. Nodes of the blockchain that participate in the mining process search for a hash output with predefined properties while the input of the hash function depends on the current blocks of the blockchain and the new block of transactions to be added to the blockchain.

Proof-of-work computations based on hash functions may not be useful in themselves except that they are required to implement the irreversibility of the distributed ledger.

Moreover, generally, it is known to use a blockchain for storing a variety of data. For instance, images, videos, measurements, and text files can be recorded on the blockchain in the form of a transaction.

In some embodiments, MaaS blockchains may require to handle a large number of passengers, store various types of journey records, large size of block, peak of processing at rush hour and so on.

In some embodiments, generally the distributed ledger or blockchain is suitable for MaaS application, since it provides a distributed database for a journey history among multiple players, without limiting the present disclosure in that regard.

Moreover, in some embodiments smart contracts are used, e.g. for MaaS. For example, ticket or MaaS services are provided based on the agreements between passengers and service providers/operators. Thus, in some embodiments normal cases (e.g. buying a ticket) or exceptional cases/procedures other than a normal (e.g. just buying the ticket) may be addressed with smart contracts. The smart contracts may handle these exceptional procedures in addition to normal procedures.

In some embodiments, smart contracts are computer language-based contracts in the blockchains. Smart contacts may be automatically executed if predefined conditions are met, such as a predefined input from one or more sensors, a user interface input from human, an application interface (API) call from other servers, etc. as will also be discussed in more detail further below.

In some embodiments, a key success factor of smart contracts may be to guarantee the authentic input (and output also) from/to real world, and in some embodiments, a blockchain oracle (e.g. server) is provided between an external input (e.g. sensor) and smart contracts and it is responsible for it.

It has been recognized that the question of how to use smart contracts for MaaS applications (or other applications) may be an issue and that, in some instances, it may be important for smart contracts to get a reliable input for execution.

As a first example, in some embodiments, smart contracts are not running with just a blockchain, but there may be a need for a system, such as input and output system, which is relevant to a specific application. For example, in some embodiments, a MaaS application needs to detect check-in of a passenger, and, thus, some embodiments address this and address a system architecture, nodes/servers, etc.

As a second example, smart contracts may rely on the authentic input/output from a sensor or any input and output. In the cryptocurrency case, only a number may be transferred, whereas, for example, a MaaS application needs to interact with the actual physical world, e.g. riding the train, unlock the bike, call the ride share on the right location and ride it, and so on. In some embodiments, a node called "blockchain oracle" hereinafter may be provided for ensuring the right input/output to smart contracts.

Additionally, some embodiments pertain to concrete procedures for MaaS application.

In the following a brief outline of embodiments discussed in the disclosure is given:
System Architecture
  Data flow of MaaS system (recap of previous invention)
  Additional functions/nodes for smart contracts
Example of Smart Contracts
  Pseudo code example
Trigger of Smart Contracts Execution
  Conventional ID solution
  Location-based (geo-fencing) solution
  Biometric based solution
Other Blockchain Oracle Functions
  The data integrity check
  The authentication/credential check of sensors/terminals
Using Unique ID with Hardware/Smart Phone/Wearable
  Binding procedure
  Verification procedure In the following a blockchain and its general data structure will be explained under reference of FIG. 1. In this embodiment of a blockchain, features are a network/topology, a consensus algorithm a Hash function, participant authentication, a scalability/block structures and performance.

FIG. 1 illustrates a general structure of a blockchain 1. The blockchain 1 includes a chain of multiple data blocks 2a, 2b and 2c, wherein the block 2b is a current block (Block #N), the block 2a is a previous block (Block # N−1) and the block 2c is a future or successor block (Block # N+1). Each block includes a hash function result of a previous block, a main data structure, an input value for hash function and hash function result of the current block, wherein the hash function result of current block (2b) is always used as input to the next block (2c).

Moreover, each block includes a "Number used once", which is a one-shot random number for a secure blockchain processing, and which can prevent replay attack. For instance, if an attacker copies the previous transmitted data and reuses the copied data again for spoofing, the receiver is able to detect the spoofing communication because the next data must be used with a different "number used once". This random number is sometimes referred to as "nonce" in cryptocurrency.

Additionally, the time stamp may be inserted in each of the blocks 2a, 2b and 2c. The blockchain 1 is an example of a distributed ledger, which may be used, for example, for providing MaaS in some embodiments.

Figure 2:
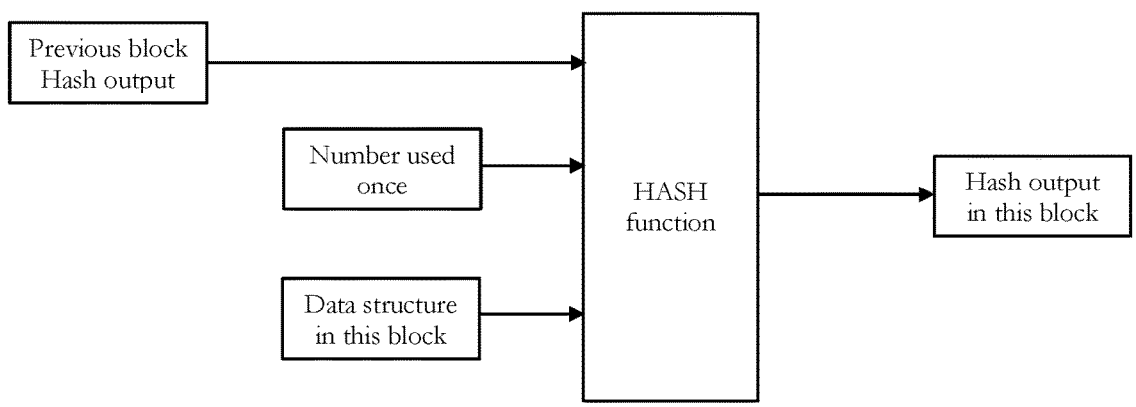
FIG. 2 schematically illustrates hashing in a blockchain.

FIG. 2 illustrates the input and output of a hash function, which is used, for example, for the blockchain 1 of FIG. 1.

Generally, a hash function is any function that can be used to map input data to output data with a specific algorithm. The size of input data can be large and various, contrarily the output of data could be compact and can have a fixed size. A known (and famous) algorithm which is used for hashing in some blockchain embodiments is the Secure Hash Algorithm (SHA) designed by the United States National Security Agency (e.g. SHA-2, SHA-256).

The input for the hash function are a previous hash output, the number used once and the main body of data in the current block (e.g. block 2b in FIG. 1). The output of the hash function is a unique value response to the input values. If someone tries to tamper the main body of data, the output of hash function cannot be consistent.

Embodiments of a distributed ledger (blockchain) in this disclosure may implement a consensus protocol or algorithm. For instance, in some embodiments, the Byzantine Fault Tolerance (BFT) is used for the consensus protocol, which is resilient to spoofing of database and fault of hardware.

A well-known consensus algorithm, which is implemented in some embodiment, is the so-called Practical Byzantine Fault Tolerance (PBFT).

In some embodiments, a permission blockchain is used and the relatively small number of permissioned blockchain nodes are in charge of consensus (validation of block).

Figure 3:
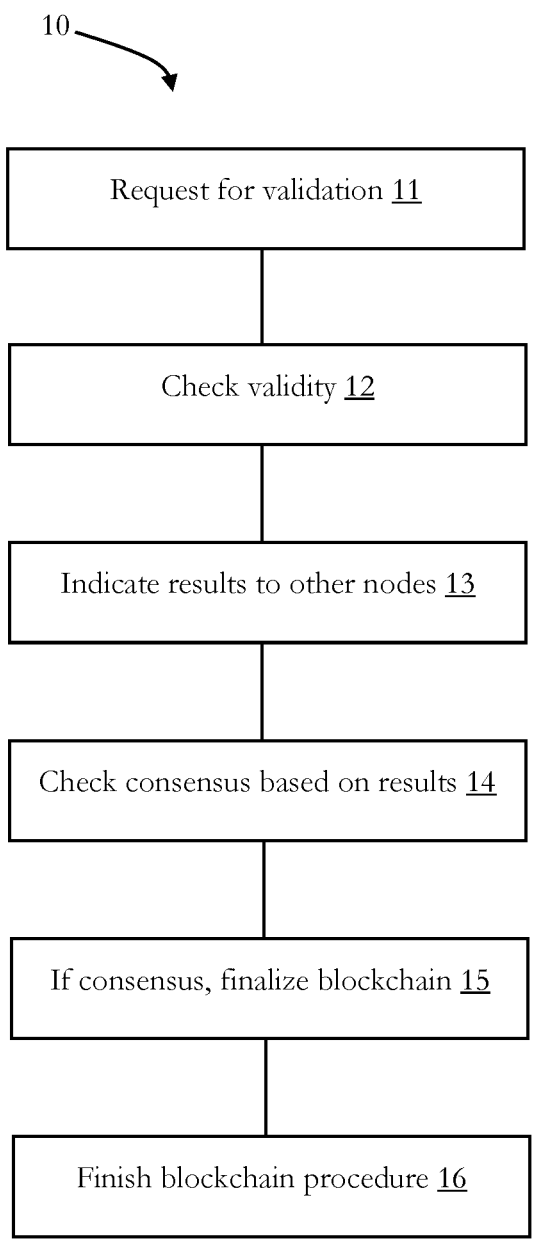
FIG. 3 is a flowchart illustrating an embodiment of a consensus protocol.

FIG. 3 exemplary illustrates the process 10 of PBFT.

A leader node (it also called non-validating peer) requests at 11 other nodes to validate the blockchain. At 12, each requested node (validate peer) checks the validity of the blockchain with a hash function and indicates its result to other nodes at 13. At 14, a node receives the validity results from multiple other peers and checks the consensus of the blockchain, if it receives more valid results than a predefined criteria. If there is a consensus, at 15, the node writes/finalizes the blockchain. A leader peer checks the overall progress of the validity check in other nodes and finishes at 16 the blockchain procedure.

For resilience, the total number of nodes is more than 3f+1 in some embodiments, wherein f is the number of allowed failure nodes. For example, f=1, there is a total 4 nodes; if f=3, there is a total of 10 nodes, etc.

In some embodiments, the PBFT is with permission blockchains for mobility service blockchains, as discussed herein, providing at least partially the following features:

With respect to security, the PBFT provides in some embodiments a little risk of 51% attack, which is common for cryptocurrency because permission the peer which is in charge of consensus must be trusted. With respect to privacy, the end user cannot access the whole blockchain because only mobility service providers handle it at a (peer) node (due to the permission based blockchain and end users may not have the permission to access the blockchain). With respect to performance, the processing time for consensus is very short in some embodiments due to a small number of peers having a high performance. With respect to flexibility, the block size and format of blockchains can be flexible compared to public blockchains in some embodiments.

Figure 4:
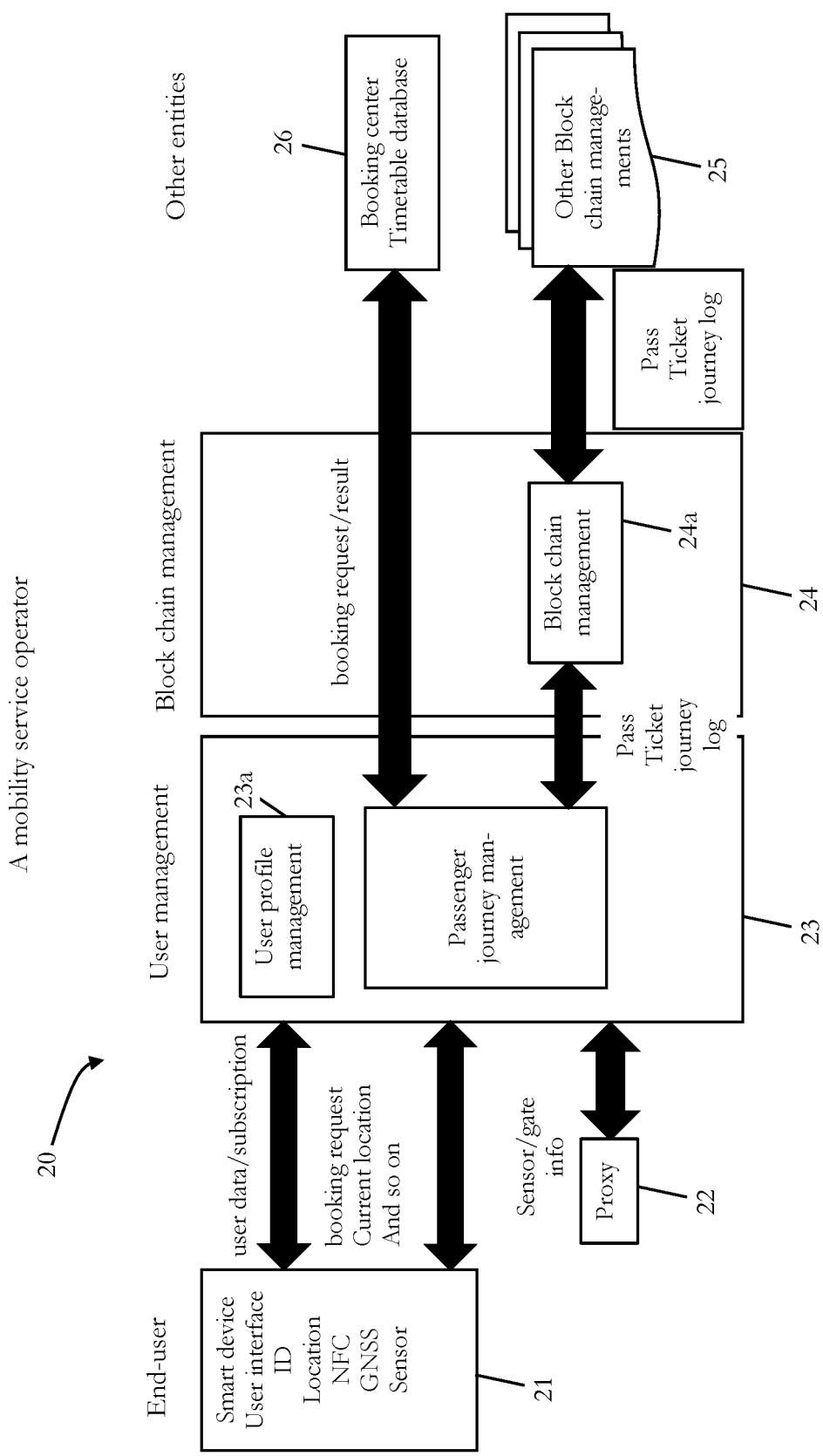
FIG. 4 illustrates a data flow in a MaaS system.

In the following, the data flow of a MaaS system 20 is explained under reference of FIG. 4, illustrating the overall data flow. In the MaaS system 20 it is exemplary assumed that the end-user has an own terminal 21, e.g. a smart phone (or any other type of electronic (mobile) device). Some users (e.g. visitor from oversea) may not have a smartphone or the like, and in such cases, for example, an alternative solution may be provided, which is based on a proxy function (proxy 22) in FIG. 4, which provides a gate to the user.

FIG. 4 illustrates the data flow diagram of the MaaS system 20, wherein three main sections are provided, an end-user section on the left side, a mobility service operator/provider section in the middle and an other entities section on the right side, wherein the end-user section and the other entities section communication with the mobility service provide section in the middle.

For this embodiment of the MaaS system 20 it is assumed that the mobility service provider has a user management function 23 with a web server or cloud for customer services and a user profile management function 23a and a passenger journey management function 23b. It further has a blockchain management function 24. The blockchain function 24 having the block chain management function 24a communicates with blockchain management functions 25 of other entities section. If a seat reservation/shared ride booking is provided by a booking center 26, a central booking server/cloud is provided.

The end user communicates with its own terminal, i.e. smart phone 21 in this embodiment, which has exemplary a user interface and sensors, e.g. GNSS, NFC, etc.

As can also be taken from FIG. 4, the end user can perform, for example, the following actions with the terminal or via the proxy 22: Subscription of services/purchase of one day/one week ticket; booking of train, reservation of car/ride share; transport embark/alight permission/record; post processing after alight (e.g. customer survey, refund or compensation of delay), etc.

The user profile management function 23a is configured to store static data, e.g. name, age, contact address, payment method (e.g. credit card), service subscription status, the preference of transport, any other unique ID, e.g. IMEI (International Mobile Station Equipment Identity), etc. and communicates with the terminal 21.

The passenger journey management function 23b is configured to perform several actions and to communicate with the terminal 21. For instance, with respect to a multimodal transport pass it manages, for example, a subscription of MaaS monthly service and a purchase of one-day ticket, one-week ticket, etc. With respect to a journey planning (or journey planner), it provides destination input, route selection/transport options, booking/travel arrangement and issues the ticket and issues the ticket ID, generates itinerary for the passenger and issues the itinerary ID etc. On the journey of a passenger/user, the passenger journey management function is configured to start the journey and, for each section of the journey (iteration), to check the pass/ticket hold and record the embankment, record the alight and add the journey log to the blockchain, and at the end of journey to terminate it and to close the itinerary.

The blockchain management function 24a communicates with the passenger journey management function 23b and the other block managements 25. It is configured to add, to validate/execute consensus protocol and to read the blockchains. Moreover, as can also be taken from FIG. 4, the pass, ticket and journey log information is communicated at least between the passenger journey management function 23b and the block chain management function 24a and between the block chain management function 24a and the other blockchain managements 25.

In the following, an embodiment of a blockchain 30 including a passenger journey history is explained under reference of FIG. 5.

Figure 5:
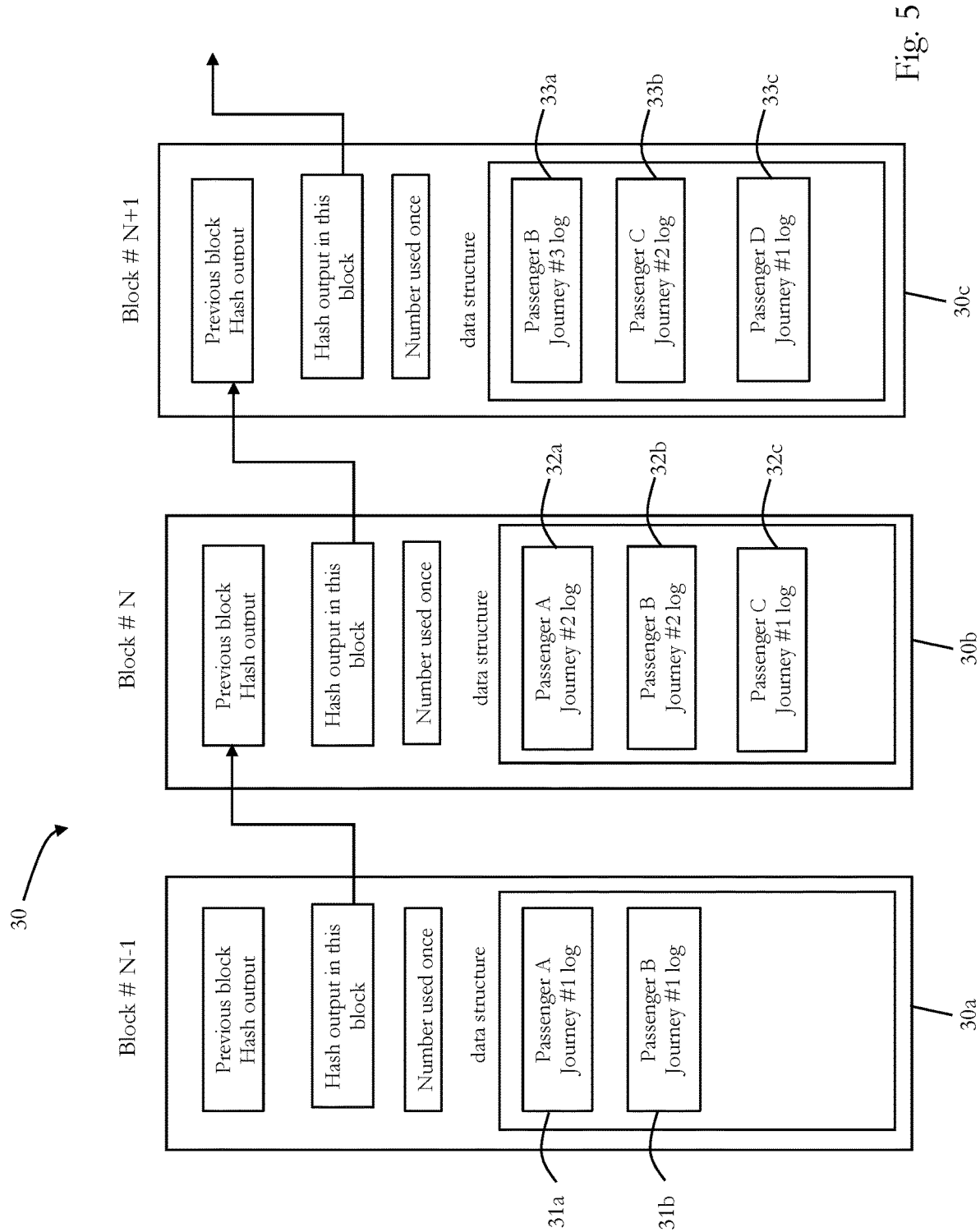
FIG. 5 illustrates an embodiment of a blockchain including journey log data.

The blockchain 30, as also generally explained under reference of FIG. 1, has several blocks 30a, 30b, 30c, wherein in FIG. 5 a past block 30a (Block #N−1), a current block 30b (Block #N) and a successor or next/future block 30c (Block #N+1) are exemplary illustrated.

Each of the blocks 30a, 30b and 30c can include one or more passenger logs in a transaction within a maximum given block size and within an associated data structure. In FIG. 5, the block 30a on the left hand side (Block #N−1) handles two passenger logs 31a and 31b. The hash output from the N−1 block 30a is provided to the next N block 30b (current block). The block 30b (Block #N) handles to the next journey logs 32a and 32b of passengers A and B, and, additionally, a journey log 32c of a passenger's C journey. If, for example, a passenger D issues a new journey log, but if simultaneously the block size limit is exceed, the further journey log will be handled in the next block, i.e. in block 30c in the present example, which includes a further journey log 33a entry for passenger B, a further journey log entry 3cb of passenger C and a further journey log 33c entry for passenger D, such that the block 30c (Block N+1) handles the next journeys of passenger C and D and the remaining log of passenger D. Then, the hash output (N+1) is provided to the next block (N+2) (not shown in FIG. 5).

Generally, a journey log in the blockchain 30 may include at least one of the following information:

Issuers: multimodal transport pass issuer, mobility service provider/transport operator, passenger id (anonymized data).

Ticket info: Type of ticket, Type of transport (railway, rideshare and so on), Seat reservation (train/seat number), Price or ticket, Terms and conditions.

Boarding record: The location of embankment, time/day of it, the location of alight, time/day of it, Unused/used.

Remarks: Special notes (e.g. cancelled, delayed).

In some embodiments, the blockchain for MaaS is assumed to use permissioned blockchains. In permissioned blockchains, only permitted operators (forming a consortium) can add/read block and limited participants are allowed to join the validation of transaction (i.e. consensus with trusted players). Hence, in some embodiments, for example, the mobility service providers are organized in a consortium and only those having the according permission are allowed to access the permissioned distributed ledger or blockchain, while malicious participants or dishonest ones cannot join the consortium of blockchain.

In the following, an embodiment of a communication network 40 for providing a (permissioned) blockchain for MaaS is explained under reference of FIG. 6.

In terms of resilience, the communication network 40 mitigates the risk of single point of failure (SPOF), which is typically the weak point of systems, e.g. for conventional systems which are heavily relying on the central of server could be SPOF in the system.

Figure 6:
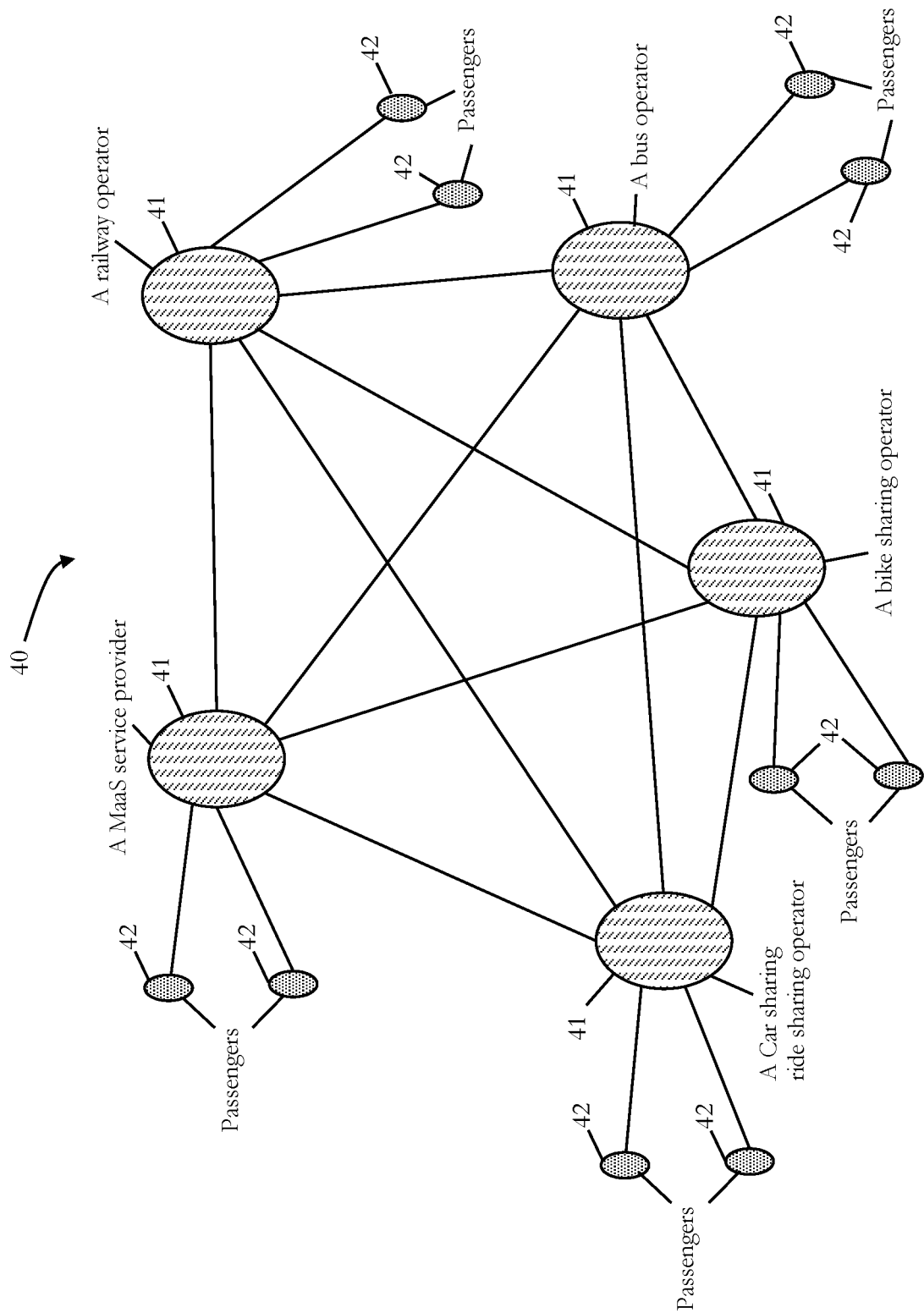
FIG. 6 illustrates an embodiment of a communication network for providing a blockchain.

As can be taken from FIG. 6, the communication network 40 has multiple nodes (or entities) 41 (large circles), which are associated with different operators or mobility service providers, such as a MaaS service provider, railway operator, a car sharing/ride sharing operator, a bike sharing operation and a bus operator.

Moreover, there are multiple passengers 42 (small circles) which can communicate with the nodes 41 of the mobility service providers. The mobility service provider nodes 41 may form together a communication network 40, which provides the permissioned blockchain for MaaS (e.g. blockchain 30 of FIG. 5).

A passenger 42 subscribes, for example, the monthly MaaS service provided by mobility service provider or buy one-day/one-week pass for multi-modal transport services by communicating with its terminal (e.g. terminal 21 of FIG. 4) with the associated mobility service provider.

The mobility service provider 41 could be a new service provider, such as MaaS operator (e.g. shared ride), bike sharing service provider, travel agency in addition to conventional transport operators such as car railway companies, tram operator, as mentioned.

The mobility service providers 41 connect to one another over the communication network, which is a logical connection, wherein a direct connection among operators or mobility service providers is not necessarily required, but it may require low latency and high throughput.

The entity or node 41 of a mobility service provider may have various functions, but there are two main functions, as also discussed above for FIG. 4, namely a passenger management function and the blockchain management function. The passenger management function supports booking of seat, booking of shared ride/taxi/car rental/seat reservation of train, monthly subscription or buying one-day ticket and so on. Like a normal e-commerce site, it provides a user interface of website or smart phone back-end processing.

On the other hand, the blockchain is hidden for the end-user in the present embodiment, but it is accessed with and by multiple mobility service providers. Additionally, in the present embodiment, a consortium (permissioned) blockchain is implemented among nodes 41, which validates the blockchain ledger among the mobility service providers which are members of the consortium.

In some embodiments, this above example is extended to international MaaS operation or MaaS operation in different regions. The blockchain is then defined as a multi-tier structure. The first tier blockchain is configured between countries or between regions and the second tier blockchain is configured in the consortium of the region. For example, a representative provider in regional consortium may join the first tier blockchains and handle the international services.

Figure 7:
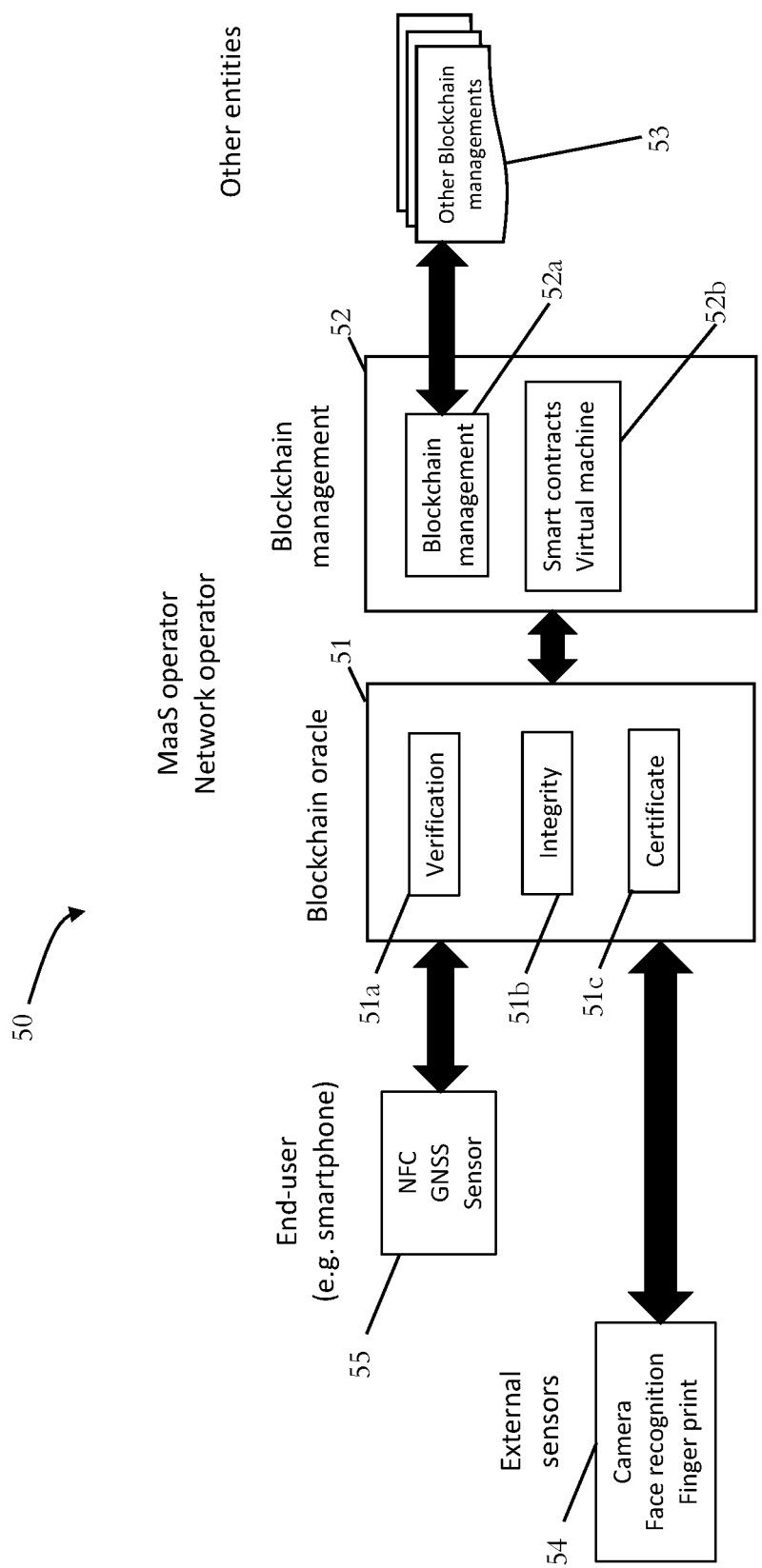
FIG. 7 illustrates a data flow of an embodiment of an MaaS system implementing a blockchain oracle.

In the following, an alternative embodiment of the MaaS system 20 of FIG. 4 is explained under reference of FIG. 7 illustrating a block diagram of a MaaS system 50.

Contrary to the embodiment of FIG. 4, in the present embodiment of the MaaS system 50, a blockchain oracle 51 is provided, including a verification block/function 51a, an integrity block/function 51b and a certificate block/function 51c.

Furthermore, in a blockchain management 52, additionally to a blockchain management bock/function 52a which communicates with other blockchain managements 53, a smart contract and virtual machine block/function 52b is provided.

Moreover, external sensors 54 are provided, such as a camera (for face recognition) or other sensors, e.g. for fingerprint detection, which can communicate with the blockchain oracle 51 (e.g. the certificate function 51c).

An end-user having a smartphone 55 with sensors (e.g. NFC, GNSS; or other sensors), can also communicate with the blockchain oracle 51 (e.g. with the verification function 51a).

The blockchain management function 52 may handle the smart contracts and the new function "blockchain oracle" 51 may handles the input data to smart contracts (e.g. input from sensors 54 and/or from sensors from the smartphone 55).

The smart contract is a kind of software code and it may be deployed in the blockchain in addition to data (e.g. in addition to journey data). However, as smart contracts are a kind of software, they typically need a central processing unit (CPU) for execution. Therefore, the virtual machine is provided, which may be configured as a platform of smart contracts and which may provide corresponding computing resources.

The blockchain oracle 51 is responsible for the correct input to the smart contracts in this embodiment and it is a kind of proxy server between the sensors 54 and the smart contracts. When the smart contracts access the data from the sensor 54, the target sensor may indicate it with a Uniform Resource Identifier (URI) or a Uniform Resource Location (URL) based on a Restful API: For example: "https://proxy.blockchainoracle.com/inputdevices/sensor1"

In this example, the URL "proxy.blockchainoracle.com/" is the blockchain oracle server name, and the part "inputdevices/sensor1" is the identifier of the target sensor under the blockchain oracle 51.

The values may be return with Extensible Markup Language (XML) or Javascript Object Notation (JSON) format or the like.

However, the blockchain oracle 51 is not only a proxy server between the sensors 54 and that smart contracts, but it is also responsible for the validation of input and output for smart contracts.

For example, the blockchain oracle may verify the position/time stamp from the sensors 54. Furthermore, it may check the data integrity (unchanged) and it may certify whether the connected sensor is the correct one.

As mentioned, a smart contract is a kind of software code, and, thus the physical deployment is flexible. For example, the virtual machine can also separately run in the trusted cloud computer at a different (or any) location.

Generally, there exist many possibilities/combinations of deployment of various sensors with various ways and the present disclosure is not limited to specific examples in that regard.

In some embodiments, the type of verification or even if any verification is performed and/or whether a blockchain oracle is involved in the verification process, depends on the risk that the data which is input to the smart contract and/or received from the smart contract may be tampered. For instance, if a MaaS operator owns the database of install status/deployment environment of sensors or has the (exclusive) control over it and it is almost impossible to modify/tamper it (e.g. a security camera is installed on a tall tower, which the people cannot reach), a simplified (verification) procedure could be applied. For example, parts of the verification process may be skipped (e.g. instead of a double check a single check is performed), or the verification performed by the blockchain oracle is skipped (such that in some instances no blockchain oracle is involved/needed). In other words, depending on the degree of trust of the sensor(s), a reasonable level of verification may be applied in some embodiments.

In some embodiments, a simple way/common way is to use sensors in the passenger's smart phone/wearable devices. Alternatively (or additionally), one or more external sensors (e.g. camera) in the transport facility are deployed, e.g. of railway stations, airports, bus stop, station of bike sharing, streets and so on. For example, the airport or railway station may have multiple security cam-eras, which is used for or as MaaS sensors in some embodiments.

The MaaS operator/transport operator deploys the blockchain oracle 51 in this embodiment. However, in other embodiments, a third party may offer the services of the blockchain oracle 51 instead.

For example, a telecom operator/mobile network operator who has internet of things (IoT) functions, location server, security functions, applications and services may offer the blockchain oracle function also in some embodiments.

In the following, embodiments of a smart contract are discussed:

The smart contracts are stored in the blockchain as codes in addition to the data in the block.

The description or content of smart contacts is a kind of software code (e.g. JavaScript, Solidity) rather than human described natural language contracts. Thus, in some embodiments, there exist an IF-THEN-ELSE structure and conditions.

Generally, the smart contracts (computer language) may support at least one of the following, in some embodiments:
Loop structure (if Turing-complete language)
Complicated conditions like multiple variables, ternary operator
Keep the value of internal variables (if stateful smart contract)
Read/write/update of block in the blockchain
Input/output from/to external machine/computer/network
Direct negotiation between machines without intervention of human In the following an example of a smart contract is shown. However, there exist many computer languages for smart contracts and the following example of a smart contract is provided in a simplified pseudocode rather than a real computer language:

```
Begin
    Variable :  TicketState (open, in-use, close)
    If the ticket is issued and unused Then
        change TicketState to open
        End (if)
    Repeat (main loop)
        Receive the trigger from external
    If the trigger is check-in Then
        change TicketState to in-use
        End (if)
    If the trigger is check-out Then
        change TicketState to close
        Exit Loop
        End (if)
    End (repeat)
    Transmit the TicketState to external
    End (begin)
```

This pseudocode checks, whether the ticket has been used or not and if it has not been used, its state is set to "open". Moreover, it is checked, whether a trigger is received, wherein the trigger is, for example, a "check-in" event or a "check-out" event. If a "check-in" event is detected as trigger, the state of the ticket is set to "in-use" and if a "check-out" event is detected as trigger, the state of the ticket is set to "close". At the end, the ticket state is transmitted, e.g. to the blockchain oracle 51 or to another instance.

Generally, a smart contract can be implemented in any computer system if its computer language is supported. In some embodiments, it is important to guarantee that the smart contrasts is authentic, and that it is not possibly to modify or change it. As discussed, in a blockchain changes/modifications are detectable due to the hash function output, which would change in such a case.

In the following, embodiments pertaining to a state transition in stateful smart contracts is discussed under reference of FIG. 8.

If the smart contract is stateful, it may have different behaviors depending on the current state. This is useful in some embodiments, in order to cover the (complicated) travel policy/transport tariff.

For example, a ticket may refundable before it is used, but, on the other hand, the refund should not be allowed for when the ticket has been used.

Figure 8:
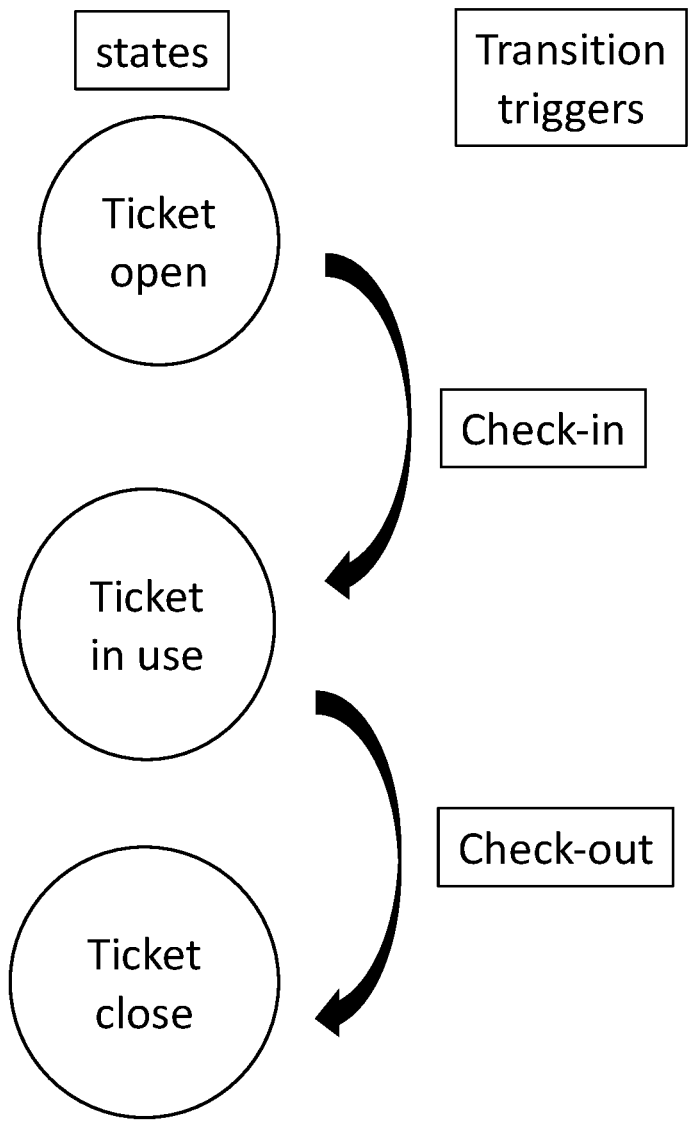
FIG. 8 shows a transition diagram illustrating transitions of a state of a smart contract.

FIG. 8 illustrates three different internal states of the associated smart contract.

In the beginning, when the ticket is issued, the state is "Open", i.e. this ticket is valid, but not in use yet.

When the passenger meets the trigger condition of "check-in", then the state transits to "in-use", and then the ticket is no longer refundable.

When the passenger meets the trigger condition of "check-out" (e.g. arrived at the destination), the state is "closed". The smart contract may check the condition of proper closing. For example, if the train is delayed three hours and in order to meet the train delay compensation condition, the smart contract may automatically execute the procedure of compensation.

The number of states/transition conditions may increase/decrease up to actual MaaS use cases and, thus, can be adjusted accordingly. For example, in some embodiments for air travel, the state of check-in (at counter) and that of boarding (at boarding gate) could be separately handled.

In some embodiments, the verification performed by the blockchain oracle includes verifying whether output data, which is based on an output from a smart contract, is correctly received at a predetermined device. For instance, as discussed, in FIG. 8 the smart contract makes an output about the ticket state which can be transmitted to the blockchain oracle, which then verifies whether, for example, this ticket state is correct and is associated with the correct ticket and user. Assume, for example, that in the case that a compensation is to be paid, the blockchain oracle may verify that the compensation is justified and that the information is sent to the correct predetermined device. Also, for example, if the ticket state is open, this information should be transmitted, for example, to the correct check-in device (or data base of the MaaS operator) and also to the correct mobile terminal of the correct user/passenger. Moreover, the blockchain oracle may verify that the output data is based on the correct smart contract, in order to avoid, for example, that tampered smart contract output data are used for changing ticket states, get compensations etc.

In the following, embodiments pertaining to the trigger of smart contract execution are discussed:

One factor of success of smart contracts is in some embodiments how to get a reliable trigger in addition to accurate conditions for a smart contract.

The execution of smart contracts relies on a trusted/accurate input, which is called "(blockchain) Oracle", as also indicated above.

Figure 9:
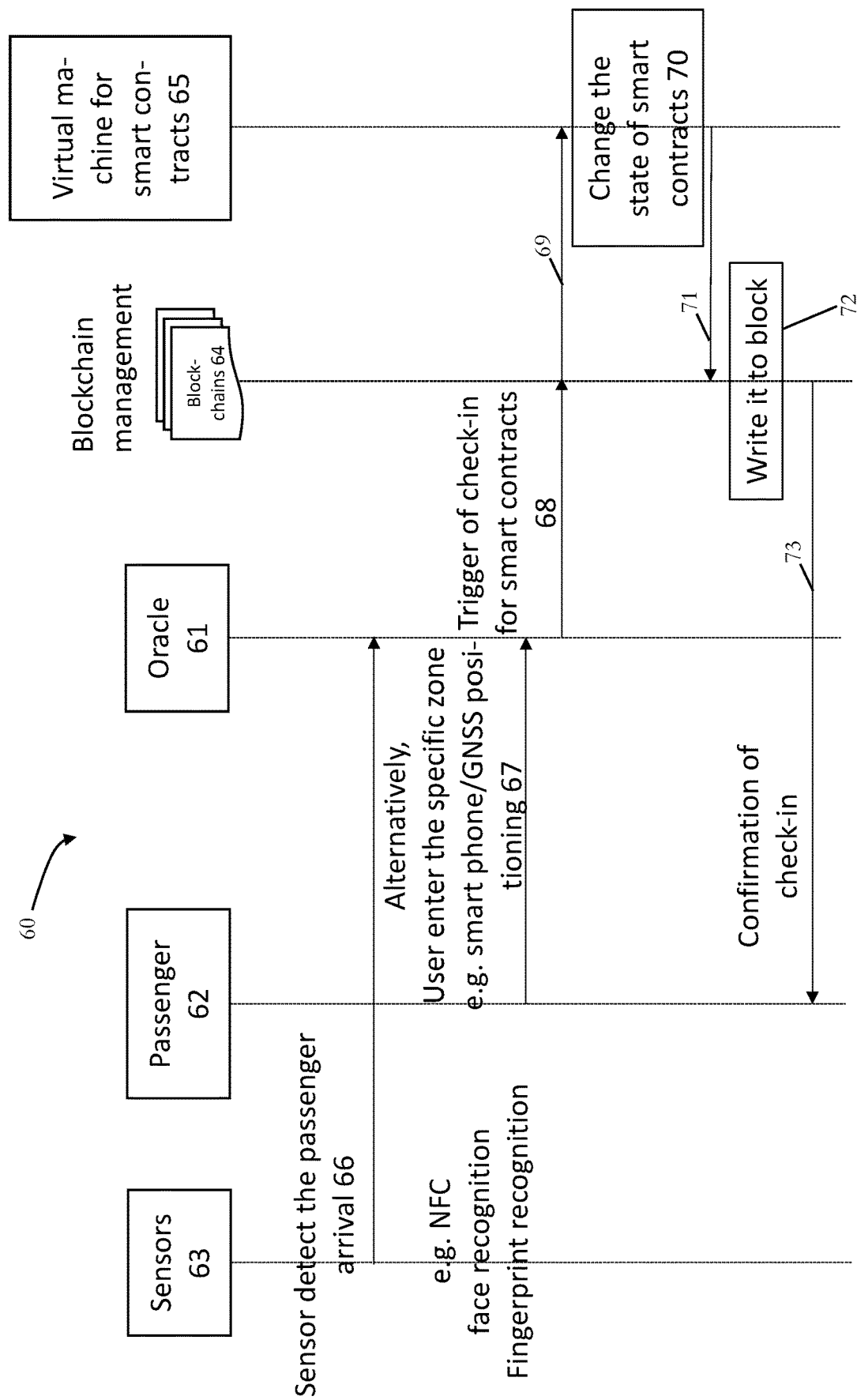
FIG. 9 illustrates a flow-chart of an embodiment of a method implementing a smart contract trigger with a blockchain oracle.

FIG. 9 illustrates a flow-chart of an embodiment of a method 60 implementing a smart contract trigger with a blockchain oracle 61. It is assumed that a passenger 62 travels with a MaaS service. The passenger 62 is about to check in. He or she has the unused ticket of a train in this embodiment.

In the check-in area sensor 63 are provided (e.g. camera, scanner for scanning ticket or the like, nearfield communication, sensor for face recognition, sensor fingerprint recognition, etc.), which are able to detect a passenger. Moreover, a blockchain management is provided which manages blockchains 64 including, as discussed above, for example, journey data, etc. A virtual machine 65 for smart contracts hosts and executes the smart contracts.

The method or process of check-in is as follows:

At 66, the sensor 63 (or one or more sensors of a sensor group 63) recognizes the passenger's arrival in a specific zone/place (e.g. station entrance, gate, platform and so on.) and informs about the passenger's arrival to the blockchain oracle 61. Alternatively, at 67, one or more sensor of the sensors in a passenger's smartphone, wearable devices or the like detects the specific zone and sends a trigger indicating the check-in or the current position of the passenger 62 to the blockchain oracle 61 or directly to the block chain management server 64.

The blockchain oracle server 61 receives the input from the sensor(s) (see 66 and/or 67) and checks the validity of them such as position, data integrity of the sensor which provided the sensor data sent to the blockchain oracle server 61, the certification of connected sensors, etc.

At 68, the blockchain management function 64 receives the trigger indicating the check-in, which initiates execution of the relevant process of the smart contract.

At 69, the blockchain management transmits the trigger to the virtual machine 65 which executes the relevant code of the associated smart contract according to the trigger/input/condition change, and then it changes at 70 the internal state (e.g. ticket open→check-in complete), as had also been discussed under reference of FIG. 8 and transmits a corresponding message at 71 to the blockchain management server.

At 72, the blockchain management function writes the status change in the block according to the result of the smart contract execution (if necessary). For example, if the multi-operator ticket was invalidated, it should be recorded in the blockchain.

At 73, the blockchain management function informs the ticket state to the passenger (optionally). For example, the passenger can take the ticket state change from the smart phone screen or wearable device, where a corresponding message is displayed (or any other indicia is displayed indicating the change of the ticket status).

In some embodiments, one important responsibility of the blockchain oracle 61 is to guarantee the right input to the smart contracts, since if the input information is wrong/inaccurate, the wrong procedure is executed, even if the smart contract is correctly described. Regardless of human error, machine malfunction/break down, malicious attack (e.g. spoofing), etc., it is the aim that the blockchain oracle 61 must prevent the wrong execution of smart contracts due to wrong input/conditions.

In some embodiments, the oracle 61 may be omitted, for example, if the sensors and/or servers are deployed by a trusted member and it is impossible to change, or to modify the data by someone else.

In the following, an embodiment of the detection of a passenger's arrival is discussed (positioning/zone detection):

For the check-in detection, there are exist embodiments of corresponding methods.

For instance, in some embodiments, a QR code/NFC or the like is used detecting an arrival of the passenger (e.g. by scanning a QR code on a ticket, using NFC of a passenger's smartphone, etc.).

Although, such technologies are known per se, in some embodiments, there is a need of verification for the smart contracts.

In some embodiments, a location based solution is provided which may involve accurate positioning techniques, which is useful for MaaS services, since thereby the position of a passenger can be accurately determined. On other embodiments, biometric-based solutions are implemented, which is also useful for MaaS applications (in some embodiments also location and biometric based solutions are combined).

In the following, an embodiment is discussed, which is based on a conventional ID (identification), for the detection of the arrival (or check-in) of a passenger.

An example for a of conventional ID/passenger arrival detection is as follows:
1. passenger name and its password are detected at a check-in machine
2. the passport is shown at the check-in machine (e.g. for scanning personal data of the passenger)
3. contact of NFC sensor, e.g. of the smartphone, is detected at a check-in gate or boarding gate
4. Show e-ticket with bar code/QR code at the gate or at a reader
5. Input with user interface of smart phone/PC at check-in location.

In some embodiments, by using this method, many manual/human based checks are involved in the check-in process. If someone makes and uses a counterfeit ticket on the smartphone screen and shows it at the gate, the human person cannot easily verify it and recognize that this ticket is a counterfeit ticket.

In the following, an embodiment is discussed, where a location-based (geo-fencing) solution is implemented.

For example, in cases where a passenger has a (high-end) smart phone or advanced wearable devices, there are various sensors in it provided. In that case, a location-based detection is applicable with one sensor (e.g. GPS sensor) or with a combination of two or more sensors.

For example, the previous generation GNSS (global navigation satellite system, e.g. GPS satellite) may have an accuracy of 30 m-50 m. Current satellite systems, such as Galileo encrypted, QZSS, quasi Zenith satellite system) or combinations of multiple satellites may achieve an accuracy on decimeter-level (e.g. 50 cm) or even an accuracy of the cm level, wherein this level of accuracy is useful for MaaS in some embodiments. In addition, in some embodiments, a combination of indoor positioning methods is implemented, which is useful for MaaS, wherein the positioning system may have very accurate clock/time stamp, which is also useful for MaaS.

In the embodiments, at least one of the following sensor/positioning methods for location-based solution are implemented, wherein each of them can be combined in any manner with each other: GNSS positioning (e.g. GPS); High accuracy satellite positioning system (Galileo encrypted, QZSS, RTK (real time kinematic) based positioning or the like); Wifi (wireless network) based positioning; cellular based positioning (e.g. OTDOA (Observed Time Difference Of Arrival), UTDOA (Uplink-Time Difference of Arrival), base station beamforming or the like); inertial measurement unit (IMU) based positioning (e.g. Gyro sensor, Acceleration sensor, e-compass or the like); Beacon signal (e.g. Low power Bluetooth (BLE)); Location maker (e.g. QR code printed at specific location) recognition with smartphone camera/image processing, and/or NFC based location detection.

The passenger, i.e. the passenger's smartphone/wearable device or the like detects the specific zone (for check-in) and sends the position or trigger to the blockchain oracle or directly to the blockchain management server. The challenge of this method is in some embodiments how to prevent GNSS spoofing or inaccurate positioning. Thus, in some embodiments, the blockchain oracle may double check the passenger's position with different methods, as will be discussed in the following.

In the following, an embodiment implementing a position/location/time stamp verification is discussed.

The blockchain oracle may double check the validity of position/location from the sensor. In addition to the location, a time stamp/clock can be verified also because the location service usually uses the accurate clock sources. As a result, the blockchain oracle may improve the accuracy of position by taken into account further position signals of more than one sensor.

For instance, two types of positioning systems may be combined (or even more than two). For example with GNSS, using more than one satellite for double checking, for example of: GPS (USA), GLONASS (Russia), BeiDou (China), Galileo (Europe) and QZSS (Japan). An example of indoor positioning, the blockchain oracle may use Bluetooth beacon, WiFi signal positioning, cellular signal, etc. In general, it might be easy to tamper one system, but it is assumed to be very difficult to tamper multiple systems at the same time. And it should be more difficult to tamper if the systems in use are randomly selected among more than two, as it is the case in some embodiments.

Moreover, in some embodiments, a double checking with user terminal positioning and network based positioning is provided. For example, the smartphone sends the own current position to a network location server and the network location server may double check with a network based positioning (UTDOA), whether the position is correct.

Moreover, also a time stamp may be checked in some embodiments. For instance, the UE internal clock and a network clock (e.g. network time protocol, NTP) or satellite clock (GNSS clock) may be used for comparing associated time stamps.

In some embodiments, a vision based location identification is implemented, as is discussed in the following.

If the end user or any vehicle has a camera/video, image/video processing/computer vision function or the like, it can be used to identify the current position/location of the end user. The autonomous driving car/advanced safety car may have a camera and a function of simultaneous localization and mapping (SLAM) for identifying the position/situation. For example, the camera/video processing recognizes the entrance of motorway/highway, and then it may send the current position or status change (on the highway) to the blockchain oracle.

Figure 10:
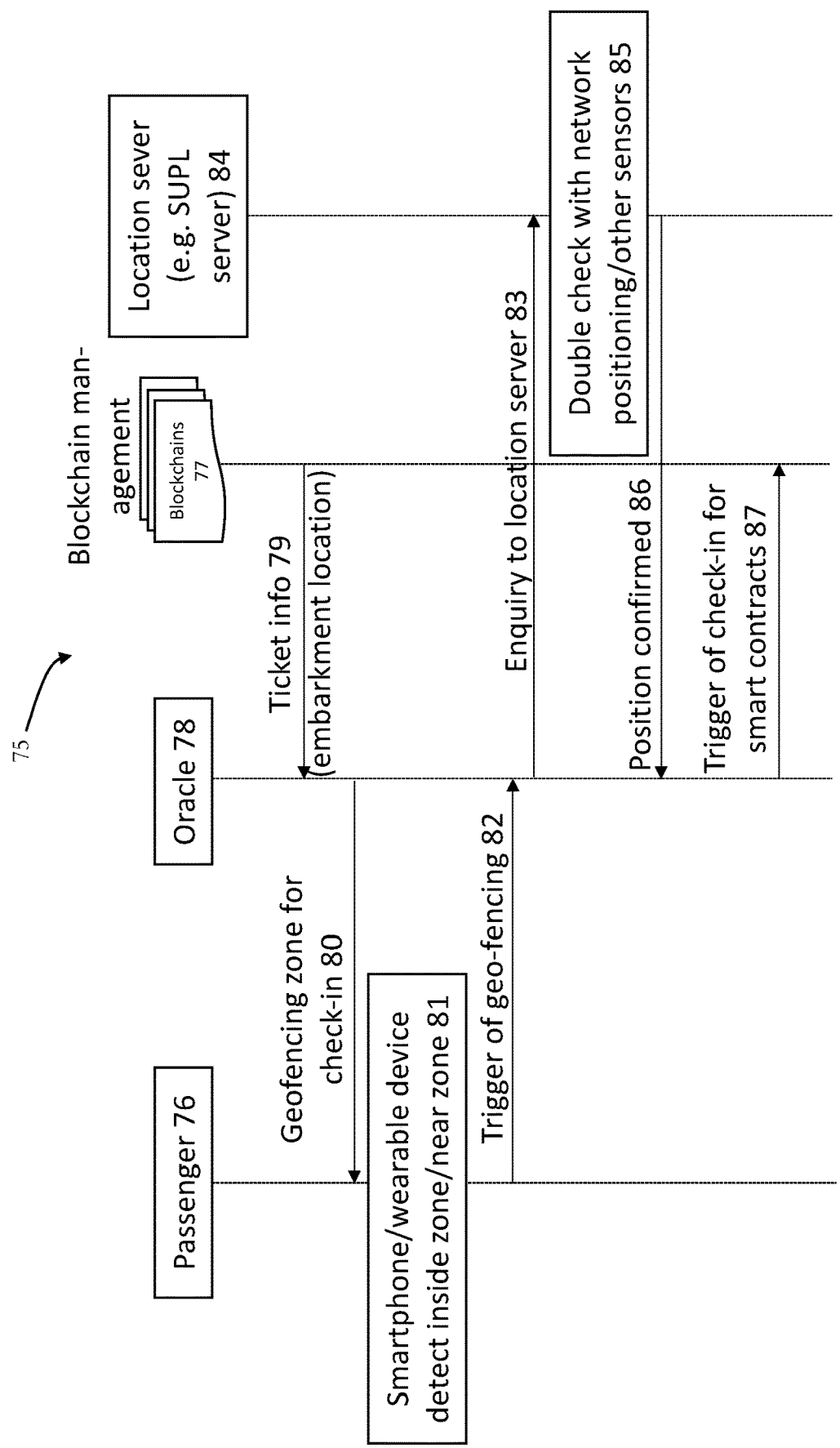

FIG. 10 is a flowchart of an embodiment of a procedure or method 75 of a location-based check-in, wherein in FIG. 10 the procedure after receiving the trigger of check-in from the blockchain oracle is omitted, because it is the same as in the embodiment of FIG. 9.

A ticket of a passenger 76 is stored in a blockchain 77 or MaaS server. The function of blockchain management 77 sends the information of embarkment location or any other check-in condition to a blockchain oracle 78, at 79. The blockchain oracle 78 checks, whether the passenger 76 has a smart phone/a wearable device and, thus, whether it has a suitable capability of positioning. Then the blockchain oracle 78 selects the location based check-in and the blockchain oracle 78 sends at 80 details of a condition of geo-fencing (e.g. longitude, latitude, the radius of zone or beacon signal information) to a smart phone of the passenger 76. The smart phone monitors, wherein the defined zone of geo-fencing trigger is entered at 81. When the smart phone detects the approaching of the zone, it sends at 82 a trigger message to the blockchain oracle via a cellular network or wireless network. Optionally, the blockchain oracle 78 may double check the location of the user, as also discussed above. For example, the blockchain oracle 78 sends at 83 an enquiry to a location server 84, (e.g. telecom operator or service provider may have SUPL (secure user plane location) server or E-SMLC (serving mobile location center). The location server 84 initiates the network based positioning discussed above for double-checking the position at 85 and feedbacks the result to the blockchain oracle 78 at 86 (e.g. in the case that the position is confirmed). If the position is confirmed, the blockchain oracle 78 sends at 87 the check-in trigger to the blockchain management 77 to execute the smart contracts.

In the following, an embodiment of a biometric-based solution for confirming check-in is discussed.

If a passenger has a biometric ID, such as an IC-chip-passport or may not have any physical ID, but biometric data is registered in a server in advance, the biometric based check-in can be used in some embodiments.

The challenge of this method may be in some embodiments that the passenger may not want to share biometric data with MaaS operators because biometric data is very sensitive personal information.

Hence, in some embodiments, the blockchain oracle does not have the biometric data, but instead a trusted biometric server is provided for identifying the person.

In some embodiments, at least one of the following sensors/means is used for implementing the sensor/input for the biometric-based solution: Video/image from security camera (face recognition), fingerprint sensors, iris recognition, and/or biometric ID (e.g. e-passport).

Figure 11:
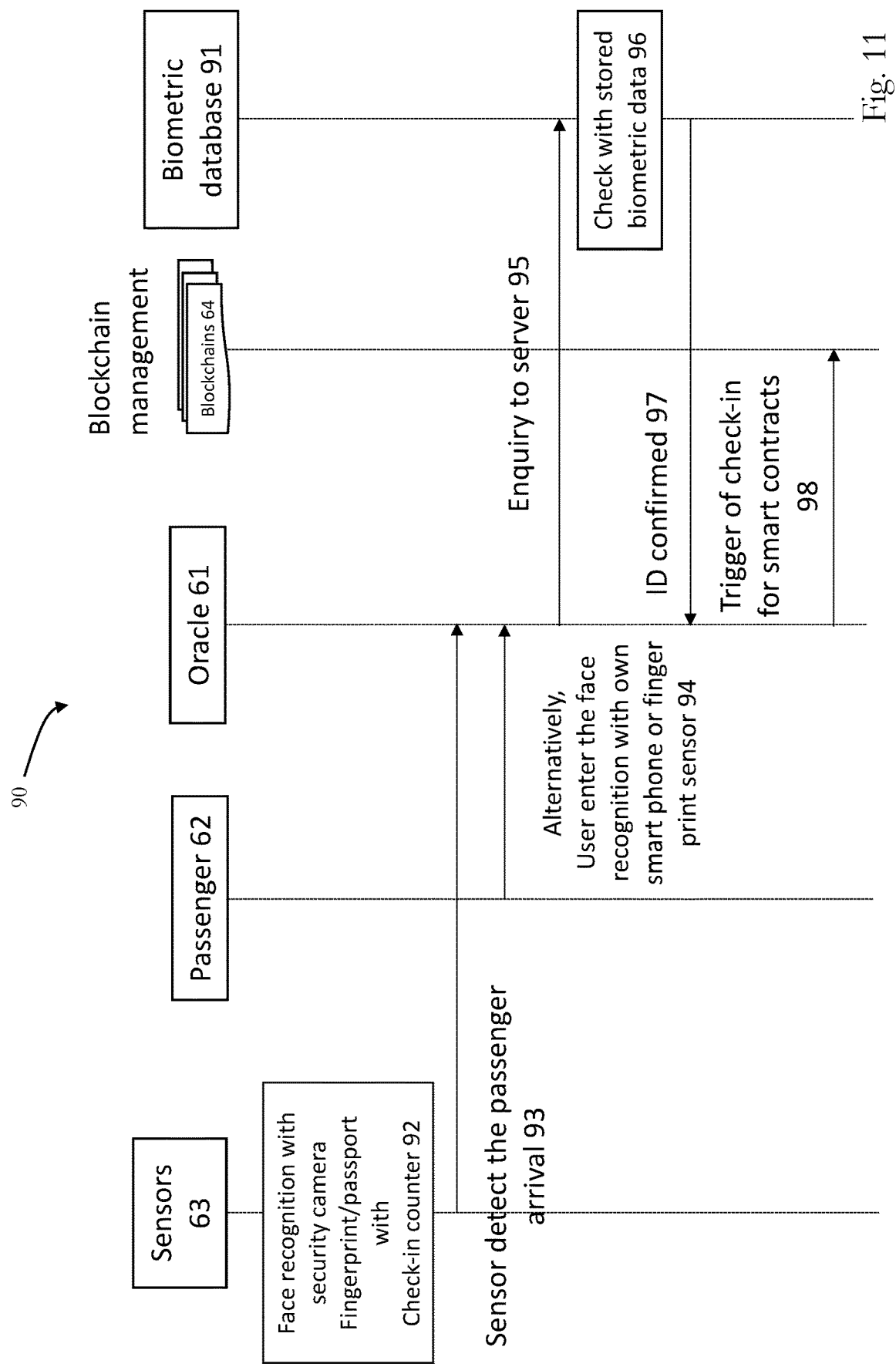

FIG. 11 illustrates a flow chart of an embodiment of a method 90 of a biometric-based check-in, wherein the procedure after receiving the trigger of the check-in from the blockchain oracle is omitted, because it is the same as in FIG. 9.

In FIG. 11, the sensors 63, the passenger 62, the blockchain oracle 61, and the blockchain management 64 correspond to the corresponding entities of FIG. 9 and it is referred to the description of FIG. 9 in that regard. Moreover, a biometric database 91 is provided, which stores biometric data of the passenger 62.

At 92, the sensors 63 perform, for example, face recognition or other biometric data acquisition and send the detection of the arrival of the passenger 62 to the blockchain oracle 61 at 93.

For example, a video/image from a security camera, a fingerprint/passport data at un-manned check-in counter or the like transmits the data. If the sensor itself can identify the person/passenger (e.g. it has face recognition function), the associated ID is send it to the blockchain oracle 61 and/or the raw data or compressed data are sent to the blockchain oracle 61 and the blockchain oracle 61 recognizes the face of the passenger 62. Even if raw data are transmitted, encryption may be provided for the data transmission.

Alternatively, if the passenger 62 has, for example, a (high-end) smart phone which has a face recognition function or finger print reader, the smartphone sends at 94 the recognition result to the blockchain oracle 61. For example, a dual camera, 3D depth camera (e.g. Time-of-Flight based image sensing) or the like may be implemented for a more accurate face recognition. Currently, such functionality is typically implemented in high-end smartphones, but it is expected that such functionality will be widely used in the near future in many smartphones and that smartphones may also have a higher capability processor for computer vision (e.g. GPU) or the like, which will then be used for MaaS applications, such as face recognition, in some embodiments.

If the blockchain oracle 61 does not store the biometric data or does not store enough details to identify the passenger, it sends at 95 a request to the external biometric server 91 to confirm it. For example, a government/transport authority may have the database 91 of biometric data for biometric passports. The blockchain oracle 61 then sends the sensor data with encryption to the biometric database 91, and then the biometric database server 91 can identify at 96 the person from the input data with its own biometric database 91. If the passenger 62 is successfully identified at 96, the biometric database (server) 91 sends at 97 the confirmation to the blockchain oracle 61. When the blockchain oracle 61 has confirmed the passenger ID, it sends the trigger of check-in to the blockchain management 64 at 98 to execute the smart contracts.

In some embodiments, the blockchain oracle itself does not store the raw data from the sensor(s) and it does not have to access the registered biometric data at the biometric data server. But, the blockchain oracle confirms the source of data (i.e. sensor) and whether it is authentic (e.g. whether the sensor is authentic) and whether the biometric server is authentic. The data is not modified or changed on the way from the sensor to the biometric server. The blockchain oracle cannot read the data, since it is encrypted, but the blockchain oracle can detect a modification of the data because of an integrity function may be provided, as discussed further below. The oracle simply know that the passenger has been identified by biometric server. This is a kind of Zero-knowledge protocol, which is implemented in some embodiments.

In the following, embodiments pertaining to data integrity check with a blockchain oracle are discussed.

The blockchain oracle receives the data from sensor(s) and needs to check the integrity of it.

There are various embodiments pertaining to data integrity check. One typical embodiment uses a hash function, while others use an integrity data stream.

Embodiments using a hash function: The hash function and the blockchain are suitable for data integrity, since, for example, the group of sensors and blockchain oracle processors join a member of consortium in the blockchain, and the hash function of sensor data is recorded in an associated block of the blockchain. If someone modifies the sensor data in the block, there will be an inconsistency with the hash value in the blockchain of other members (e.g. of the consortium). There are various proposals and implementations of hash functions, e.g. SHA-2, SHA-3, any other sponge functions. Depending on the requirements/use cases, the hash function and related parameters (e.g. nonce) could be statically or semi-statically (i.e. changeable) selected.

Embodiments pertaining to integrity algorithm (stream): Similarly to an encryption stream, the sensor data sequence is multiplied with an integrity sequence (e.g. Ex-OR calculation) at a sender side with a key. The exact same sequence is applied at a receiver side with the same key, such that on the receiver side, as a result, the protected data become the original data. If someone would modify the data in the middle, the output result at receiver would be not the same (e.g. error detection with CRC, cyclic-redundancy check). If the key of the algorithm is regularly or occasionally changed or a combination of time stamp/time counter/packet sequence number or the like is used, the protection becomes stronger, since it is (more) difficult to performed a replay attack with copied data.

In the following, embodiments pertaining to an authentication/credential check of sensors/terminals with a blockchain oracle are discussed.

In this embodiment, it is important to check that the input data comes from authentic sensors/terminals, since if fake sensors or tampered terminals are used, smart contracts could be abused, which is to be avoided in this embodiment.

There exist various embodiments of certification of input sensor/devices, wherein this mechanism can be also used for verification of output devices, such as actuators, displays and the like.

Some embodiments implement a Hash function/X.509 Certificate, wherein the Hash function may be a signature of a sender. This idea is widely used with and known from public key infrastructure (PKI) and public key. In some embodiments, the MaaS operator (or someone else) provides the Certificate authority (CA), and issues the certification to proper installed sensors/devices.

When the sensor/device is physically installed in the specific position, the certificate is also configured in the sensor/device. This method is useful for fixed sensors which are installed and configured by professional persons (at least in some embodiments).

In some embodiments, a hardware manufacture's ID/serial number is reused. In such a case, the configuration of certificate needs work load and may need some management after installation. A simple and easy way, which is implemented in some embodiments, is to reuse the manufacture's ID like serial number, model number, location of manufacturing/factory, etc. However, the security level/uniqueness could be lower and, thus, the present method may be useful for sensors which have been set up by non-professional person or end-user, since may avoid the install/setup of a certification or certificate.

Alternatively, a manufacturer installs the X.509 certificate (see solution discussed above) in the sensors/devices at factory, or a more reliable other ID is reused as also discussed further below.

The manufacture's ID is stored in a secure memory/storage to prevent side channel attacks, since otherwise, someone may rewrite or tamper it.

In some embodiments, a cellular network/mobile phone ID is reused. Compared to a manufacture's ID, the standard based ID is reliable and unique.

Examples of 3GPP unique ID are: International Mobile Equipment Identity (IMSI), international mobile subscriber identity (IMSI), C-RNTI (cell radio network transmission identifier) (from network), P-TMSI (Packet Temporary Mobile Subscriber Identity) (from network), GUTI (Globally Unique Temporary Identifier) (from network), etc.

However, the length of the ID may be too long in some embodiments, because of the unique ID in the global case. The ID is managed by outside of the MaaS operators.

Moreover, for example, a passenger has a smart phone with two SIM card slots and two inserted SIM cards, such that the IMSI for communication is changeable depending on the connected telecom operator and/or the passenger may replace the old terminal with a new model, such that the IMEI could be suddenly changed.

Hence, for addressing this, in some embodiments, a binding procedure between a cellular ID (related mobile phone info/unique number) and a Maas user ID is provided, as discussed further below.

In some embodiments, another unique ID is used. Hence, though the embodiment discussed is based on a cellular ID, it could be another unique ID. For example, a MAC address in Ethernet, which is unique in the network card/interface. A universally unique identifier (UUID) could be used, a globally unique identifier (GUID), which is uniquely allocated to a computer, the Bluetooth device Address, iPhone's Unique Identifier (UDID), ANDROID_ID, etc., which is unique for a machine with an installed operating system/platform.

IPv6 (IP address version 6) is not global unique but less likely to conflict inside the confined network compare to IPv4, which is high likely to be reallocated due to the shortage of the address. If IPv6 is allocated for a trusted organization and not duplicated, it may be used as unique ID.

In some embodiments, a short ID is sued as unique ID.

If the ID is too short for being used as a global ID (e.g. C-RNTI is 16 bits and may conflict with the same ID in the other cell), an additional prefix or suffix can be allocated (e.g. MaaS ID or the like).

In some embodiment, a random value is used as unique ID.

If the generated number has a good uniqueness and less likely conflicts in a specific area, the random number can be used as unique ID in some embodiments.

In terms of a random value range, a distribution of randomness is required. For example, a value is generated with a pseudo-random generator and additionally based on timestamp/counter/location info, etc., it is sufficient unique.

In that case, the blockchain oracle (or terminal) generates it as a unique ID and stores it in a secure memory/storage for preventing from being side channel attacked.

In the following, embodiments pertaining to a binding/verification procedure/method of a user account and a cellular unique ID are discussed.

Figure 12:
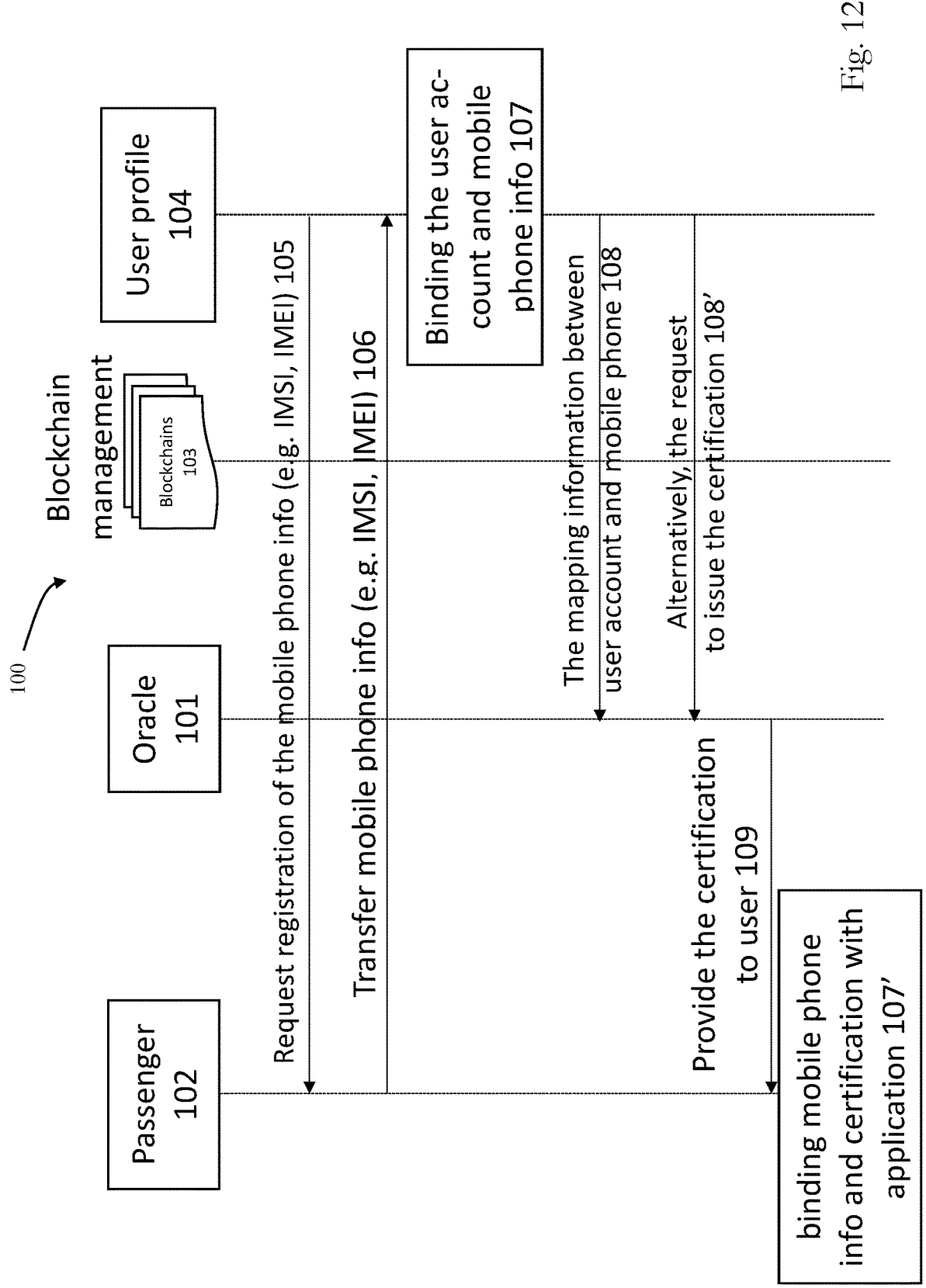
FIG. 12 illustrates a flowchart of an embodiment of a method of a binding procedure.

FIG. 12 illustrates a flowchart of an embodiment of a method 100 of a binding procedure of a user account and a cellular unique ID. A blockchain oracle server 101 is provided for communication between a passenger 102 and the blockchain management 103 and a user profile server 104.

In this embodiment, the binding means a mapping between the unique ID and the user account, which is stored in a database of the user profile server 104.

When a passenger 102 registers his user profile at a MaaS operator, the server requests at 105 the binding (e.g. using the MaaS application running on the passenger's smartphone). If the passenger 102 accepts to use the mobile phone ID, the MaaS application reads the unique ID and sends it at 106 to the user profile server 104. The ID should be encrypted for transmission.

The user profile server 104, binds then at 107 the user account and the unique ID (mobile phone ID).

The passenger 102 may select more than one ID. For example, some smartphones have more than one SIM card, i.e. more than one IMSI, such that both or more IMSI can be selected.

The user profile server 104 stores the relation between the user account and its unique ID. The user profile server 104 may send the mapping information between the user account and the unique ID to blockchain oracle 101.

Alternatively, the binding can be processed at the terminal (e.g. by the MaaS application). Then, the user profile server 104 sends at 108' a request to issue the certification to the blockchain oracle 101 for a specific user, which may include the encrypted information based on the unique ID. The blockchain oracle 101 then sends at 109 the certification to the terminal (e.g. MaaS application running on the terminal). The MaaS application then proceeds at 107' the binding between the unique ID and the received certification inside the terminal.

The binding can be combined with conventional credentials in addition to the mobile phone (terminal), which may provide even stronger security. For example, the user terminal may scan or read data from an IC chip, such as the passenger's passport, driving license or the like. If such a similar document is issued by a trusted private organization, e.g. a private ID, such as of a cooperate ID card or credit card can also be used in some embodiment. If the credential does not match the user profile, the binding is not accepted.

However, using a mobile phone or other terminal may have the risk that it is easily lost or stolen. Using someone else's phone as a transport ticket will not only cause a financial damage for a passenger, but also causes a severe security risk of transport companies or society. It is important to prevent using lost/stolen phone for ride train/airplane.

Some embodiments pertain to such a risk, and, thus, for example, there is an IMEI (International Mobile Equipment Identity) database provided, which stores the information for tracking the proper to phone or lost/stolen phone (so-called IMEI blacklist). A telecom operator has the subscriber database for contracted SIM cards and IMSI. In such embodiments, the blockchain oracle may communicate with these trusted databases and regularly checks the status of the mobile phone (or other terminal) involved in the process.

Even after binding, the blockchain oracle may request the reconfirmation of binding, if necessary, in some embodiments. For example, the terminal is used in an unexpected location/country which is less likely to be traveled by the original passenger, and then the blockchain oracle may request the double check/reconfirmation of binding.

Figure 13:
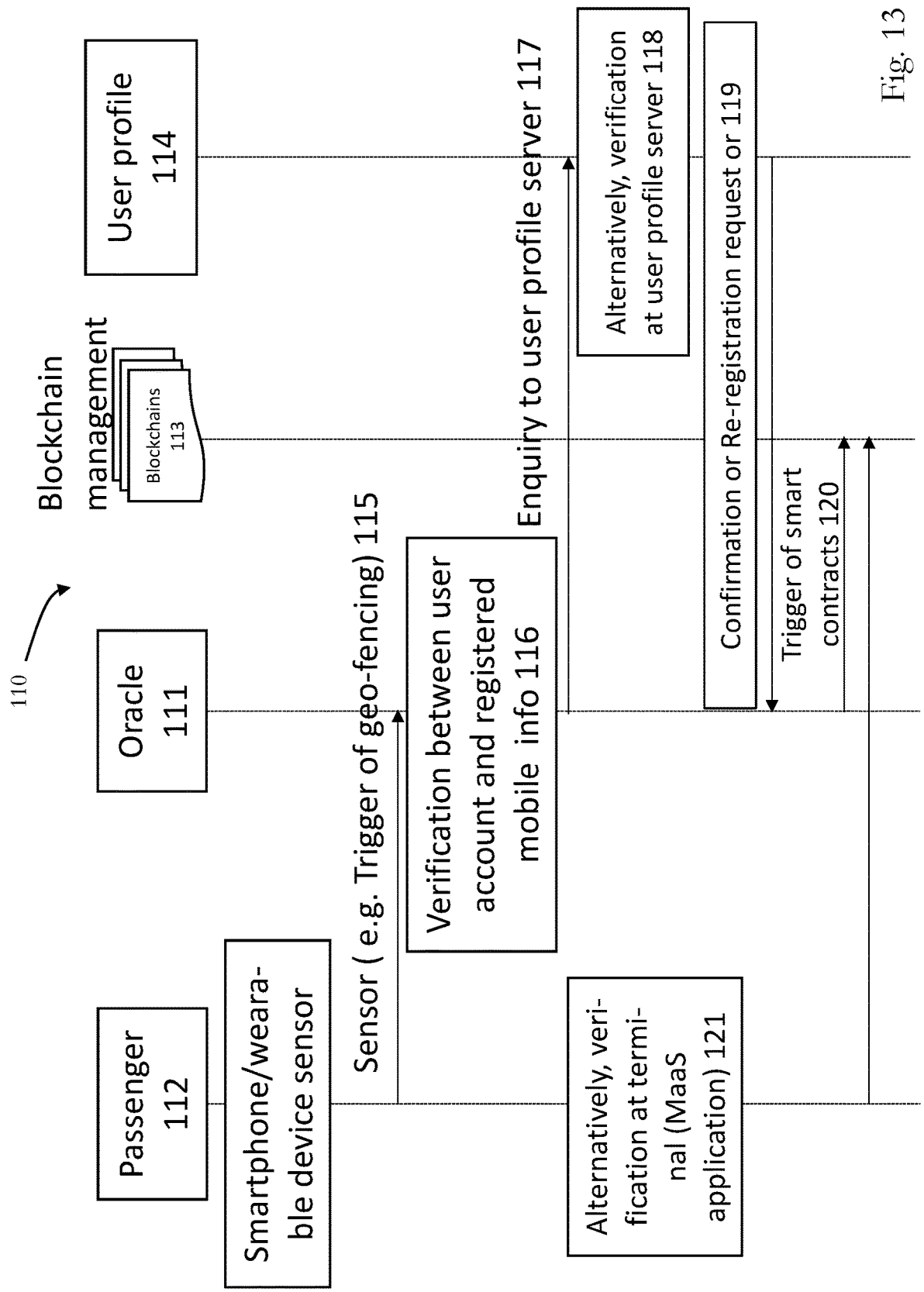
FIG. 13 illustrates a flowchart of a method of a verification procedure.

FIG. 13 illustrates a flowchart of an embodiment of a method 110 of a verification procedure of user data source. A blockchain oracle server 111 is provided for communication between a passenger 112 and the blockchain management 113 and a user profile server 114.

The passenger 112 has a smart phone/wearable device having sensors or the like and, thus, sends at 115 the sensor data or trigger to the blockchain oracle 111.

If the blockchain oracle 111 has the binding information, the blockchain oracle 111 verifies the origin of the sensor data/trigger at 116 and the binding between the user account and the registered mobile information.

If the blockchain oracle 111 does not store the binding data (as an alternative solution), the blockchain oracle 111 sends at 117 a request to verify the unique ID to the user profile server 114 at the MaaS operator site, wherein the user profile server 114 performs the verification at 118 and if the verification is successful it sends a confirmation at 119 to the blockchain oracle 111.

The blockchain oracle 111 receives the confirmation from the user profile server 114, and then the blockchain oracle 111 sends at 120 the trigger to execute the smart contracts to the blockchain management 113.

Alternatively, if the binding is executed at the terminal (application), the verification can be executed at the terminal side at 121 and then sends the trigger at 122 to the blockchain management 113.

In such a case, the smart phone/wearable device initiates the trigger by its own sensor(s), as also discussed above. The application reads the unique ID (e.g. IMSI) of binding at the terminal and verifies the correct (own unique) ID. The terminal sends the data/trigger with a stored certification to the blockchain oracle 111.

The blockchain oracle can verify the authentic data source with the certification without knowing the unique ID, as discussed above.

Although, embodiments herein focus on MaaS as use case, the general idea of the present disclosure can also be applied to other applications, such as internet of things (IoT) smart contracts, financial transaction (Fintech), telecommunications/internet services, etc.

Figure 14:
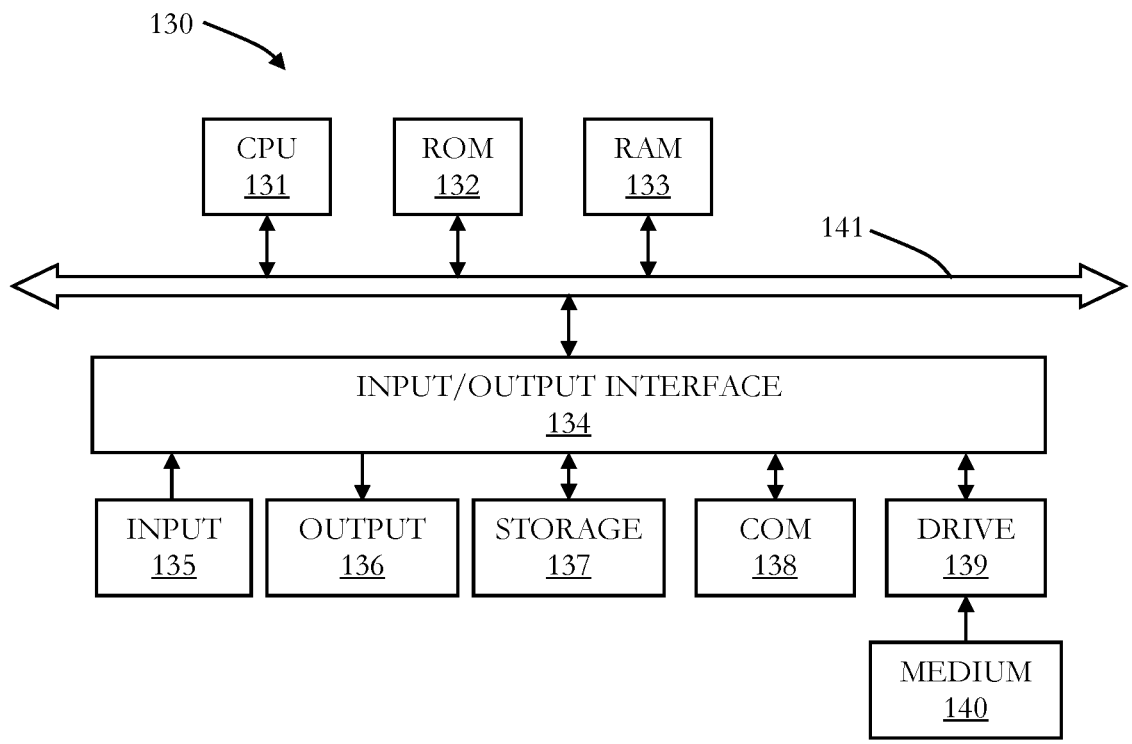
FIG. 14 illustrates an embodiment of a general-purpose computer on the basis of which a network equipment or a communication device is implemented in some embodiments.

In the following, an embodiment of a general purpose computer 130 is described under reference of FIG. 14. The computer 130 can be implemented such that it can basically function as any type of network equipment, e.g. a base station or new radio base station, transmission and reception point, or communication device, such as user equipment, (end) (mobile) terminal device or the like as described herein. The computer has components 131 to 141, which can form a circuitry, such as any one of the circuitries of the network equipments and communication devices, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment (end terminal).

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

Figure 15:
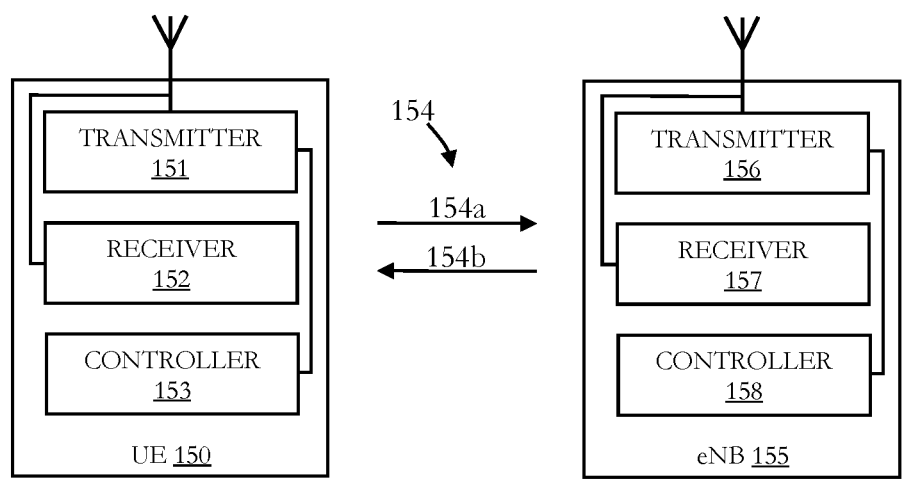
FIG. 15 illustrates an embodiment of an eNodeB and a user equipment communicating with each other.

An embodiment of a mobile terminal, configured as user equipment UE 150 and an eNB 155 (or NR eNB/gNB) and a communications path 154 between the UE 150 and the eNB 155, which are used for implementing embodiments of the present disclosure, is discussed under reference of FIG. 15. The UE 150 is an example of a communication device and the eNB is an example of a base station (i.e. a network equipment), without limiting the present disclosure in that regard.

The UE 150 has a transmitter 151, a receiver 152 and a controller 153, wherein, generally, the technical functionality of the transmitter 151, the receiver 152 and the controller 153 are known to the skilled person, and, thus, a more detailed description of them is omitted.

The eNB 155 has a transmitter 156, a receiver 157 and a controller 158, wherein also here, generally, the functionality of the transmitter 156, the receiver 157 and the controller 158 are known to the skilled person, and, thus, a more detailed description of them is omitted.

The communication path 154 has an uplink path 154a, which is from the UE 150 to the eNB 155, and a downlink path 154b, which is from the eNB 155 to the UE 150.

During operation, the controller 153 of the UE 150 controls the reception of downlink signals over the downlink path 154b at the receiver 152 and the controller 153 controls the transmission of uplink signals over the uplink path 154a via the transmitter 151.

Similarly, during operation, the controller 158 of the eNB 155 controls the transmission of downlink signals over the downlink path 154b over the transmitter 156 and the controller 158 controls the reception of uplink signals over the uplink path 154a at the receiver 157.

Further summarizing, as is apparent from the description, some embodiments pertain to communication network node for providing data to a distributed ledger, wherein the node has circuitry configured to perform at least one of provide verification of input data which is used as input to a smart contract, provide verification whether output data, which is based on an output from a smart contract, is correctly received at a predetermined device.

The communication network node may be a network equipment, such as a base station, eNodeB or the like, but the node may also be configured as a communication device, such as a user equipment, an (end) terminal device or the like (e.g. mobile phone, smartphone, computer, laptop, notebook, etc.) which has circuitry which is configured accordingly. In particular, the communication network node may be a blockchain oracle as discussed herein.

In some embodiments, the distributed ledger includes (or is) a blockchain, wherein the blockchain may include multiple blocks.

In some embodiments, the distributed ledger includes data for mobility as a service.

In some embodiments, the access to the distributed ledger is granted based on a permission right, wherein the node may be part of a consortium. The consortium may be provided by the mobility service provides, wherein, for example, each node may correspond to or may be associated with one mobility service provider.

As discussed, the distributed ledger may include a blockchain, wherein the blockchain may include multiple blocks, the block including the non-sensitive user data, and wherein the distributed ledger may include data for mobility as a service. Hence, in some embodiments, the communication network and its nodes are configured to provide MaaS.

The input data may be verified based on sensor data, the sensor data identifying a user. The sensor data may be provided by at least one sensor included in a mobile terminal of the user (e.g. a positioning sensor, imaging sensor, fingerprint sensor, etc.).

The sensor data may be provided by at least one sensor detecting a user (e.g. a sensor which is located at an arrival site or check-in, boarding or the like which the user enters and where the user is detected).

The circuitry may be further configured to provide a certification of the sensor providing the sensor data, thereby, it may be ensured that the sensor is trustful.

The sensor data may include location data or biometric data.

The location data may be transmitted to a location server for verification.

The biometric data may be transmitted to a biometric data server for verification.

The circuitry may be further configured to receive or transmit data based on a data integrity functionality, wherein the data integrity functionality may be based on at least one of: hash function, digital signature, block stream algorithm.

The circuitry may be further configured to transmit a trigger for causing execution of the smart contract.

The trigger may be transmitted in the case of a successful verification of the input data.

The circuitry may be further configured to perform binding between a user based identification and a mobile terminal based identification.

The verification may involve verification of the binding.

The mobile terminal based identification may include at least one of cellular international mobile subscriber identity, cellular IMEI.

The circuitry may be further configured to verify the authentication of a connected device.

The authentication of the connected device may be verified on the basis of at least one of: hash function based certification, standard base certification, manufacturer identification of the connected device, pre-configuration of the device, unique network or cellular identification associated with the connected device.

Some embodiments pertain to a method for operating a smart contract, wherein the smart contract has at least two different states, the method including changing a state of the smart contract in response to receiving a trigger.

The at least two different states may include at least one of: check-instate, check-out state, in-use state, unused state, cancelled state.

The trigger may be received from a trusted network communication node, as discussed herein (e.g. blockchain oracle).

The trigger may be received from a trusted sensor (e.g. verified based on certification).

The smart contract may be executed in response to receiving the trigger.

The result of the execution of the smart contract may depend on the state of the smart contract.

Some embodiments pertain to a method for controlling a communication network comprising multiple nodes for providing a distributed ledger, the method including at least one of providing verification of input data which is used as input to a smart contract, providing verification whether output data, which is based on an output from a smart contract, is correctly received at a predetermined device. The method may be performed by one or more nodes of the communication network discussed herein, and/or by a mobile terminal or any other processing device or circuitry.

The input data may be verified based on sensor data, the sensor data identifying a user.

The sensor data may be provided by at least one sensor included in a mobile terminal of the user.

The sensor data may be provided by at least one sensor detecting a user.

The method may further include providing a certification of the sensor providing the sensor data.

The sensor data may include location data or biometric data.

The method may further include transmitting the location data to a location server for verification.

The method may include transmitting the biometric data to a biometric data server for verification.

The method may further include receiving or transmitting data based on a data integrity functionality.

The data integrity functionality may be based on at least one of: hash function, digital signature, block stream algorithm.

The method may further include transmitting a trigger for causing execution of the smart contract.

The trigger may be transmitted in the case of a successful verification of the input data.

The trigger may be transmitted based on at least one of: user identification, location based detection of a user, biometric based detection of a user.

The location based detection may involve checking the user's position based on location data provided by a device of the user and a network based positioning of the user.

The location based detection may involve vision processing for identifying the user.

The method further include performing binding between a user based identification and a mobile terminal based identification.

The verification may involve verification of the binding.

The mobile terminal based identification may include at least one of cellular international mobile subscriber identity, cellular IMEI.

The method may further include verifying the authentication of a connected device.

The authentication of the connected device may be verified on the basis of at least one of: hash function based certification, standard base certification, manufacturer identification of the connected device, pre-configuration of the device, unique network or cellular identification associated with the connected device.

The distributed ledger may include a blockchain.

The distributed ledger may include data for mobility as a service.

An access to the distributed ledger may be granted based on a permission right.

The nodes may be part of a consortium.

The providing of verification may be based on a risk that the smart contract can be tampered, wherein the verification can be omitted or restricted (e.g. one check instead of double-check, etc.) based on the risk.

Some embodiments pertain to a mobile terminal, as discussed herein, for communicating with a network node (as discussed herein) for providing data to a distributed ledger, wherein the mobile terminal has circuitry configured to provide input data which is used as input to a smart contract.

The mobile terminal may have least one sensor, wherein the input data are provided on the basis of sensor data of the at least one sensor (e.g. imaging sensor, fingerprint sensor, biometric sensor, location/navigation sensor, etc.). The at least one sensor may provide position data or biometric data.

The circuitry may be further configured to perform an application, the application configured to provide the input data to the network node, wherein the application may be a mobility as a service application.

The mobile terminal may be a smartphone (or any other smart device, wearable device or the like).

The application may be configured to perform authentication of a user (e.g. by face recognition, fingerprint detection or other biometric data verification).

The application may be configured to determine a check-in of a user, based on sensor data provided by a sensor of the mobile terminal (e.g. location based check-in and/or biometric based check-in).

The circuitry may be further configured to perform binding between the mobile terminal and the application, wherein the binding may be performed on the basis of a certification, which may be received from the network node.

In the following, some terminology definitions are given, which may be applied in some embodiments (without limiting the present disclosure to the definitions given in the following. The definitions are only examples which are provided for enhancing the understanding of the present disclosure and which are only given, since the technology fields of MaaS and distributed ledgers are highly dynamical and definitions may change in the future).

The term "distributed ledger" may be known from Wikipedia, which defines: "distributed ledger (also called a shared ledger, or distributed ledger technology, DLT) is a consensus of replicated, shared, and synchronized digital data geographically spread across multiple sites, countries, or institutions. There is no central administrator or centralized data storage."

The term "Mobility as a service (MaaS)", is also known from Wikipedia, which defines: "Mobility-as-a-Service (MaaS) describes a shift away from personally-owned modes of transportation and towards mobility solutions that are consumed as a service. This is enabled by combining transportation services from public and private transportation providers through a unified gateway that creates and manages the trip, which users can pay for with a single account. Users can pay per trip or a monthly fee for a limited distance. The key concept behind MaaS is to offer travelers mobility solutions based on their travel needs."

A "Public blockchain/distributed ledger" means in some embodiments, that anyone can share the distributed database (ledger) and join to execute the consensus protocol, as also indicated above.

In contrast to that, a "Permissioned blockchain/distributed ledger" means that only permitted members can share the distributed database (ledger) and join to the consensus protocol. Permitted members which have the permission to access the blockchain are called "consortium", as indicated above. In some embodiments, permissioned/consortium type blockchains are suitable for MaaS application, since they are not public and, thus no one can access it.

The term "Instance" is understood as a software process running on a cloud. It may move somewhere in the distributed cloud.

A "Public cloud" may be defined as (https://azure.microsoft.com/en-gb/overview/what-are-private-public-hybrid-clouds/): "Public clouds are the most common way of deploying cloud computing. The cloud resources (like servers and storage) are owned and operated by a third-party cloud service provider and delivered over the Internet."

In some embodiments, the following terms will be used in the given understanding:

The term "multimodal transport pass" may be a pass which is valid for multi mobility services with specific conditions, such as valid period or available transport, unacceptable services, etc. For instance, a one-day ticket, one-week ticket, monthly MaaS service subscription, seasonal ticket, etc.

The term "mobility service provider" may be a catch-all name of any type of service provider MaaS. In some embodiments, it is typically a transport organization, such as railway companies, bus/coach, tram and taxi, car sharing, ride sharing, bike sharing and so on. Some of the mobility service providers may not provide the actual transport means, but may provide only a booking/arrangement, comparable to a travel agency or online booking site or the like.

The term "Pass" may be a transit pass or travel card (UK) (see also https://en.wikipedia.org/wiki/Transit_pass). In the present disclosure, a multi-modal pass shall also fall under the term "pass", which means that the pass may be valid among more than one transport operator (or mobility service provide) and, thus, it may cover not only public transport, but also cover other types of mobility, such as ride share, bike share, etc. The pass may include the information of acceptable transport, valid period, and any other conditions of ticket issue/transport ride. The MaaS may provide a monthly service subscription with some option of service level in some embodiments. A passenger or user may pay the service subscription fee or purchase of specific period pass to a pass issuer (which may typically be a mobility service provide which issues the pass). The pass may be issued by transport operators or travel agencies, MaaS service provider, etc. (which may all fall under the term mobility service provider as discussed above). Hence, as mentioned, some of the pass issuers may sell a pass, but may not provide the actual transport service or transport means.

The term "Ticket" may be a ticket for a one-way journey of the specific section like one-way train ticket with (or without) seat reservation. The ticket may be issued under the multi-modal transport pass and its terms and conditions in some embodiments and it may include the information of selected transport, seat number, price, etc. In some embodiments, even if no seat reservation is required or unlimited travel is allowed, the ticket may be issued for revenue sharing among multiple mobility service providers. Moreover, a passenger (user) may not directly pay for a ticket issuer, but a pass issuer may pay for the ticket issuer instead of the passenger and the ticket may be issued by a transport operator or service provider, i.e. by a mobility service provider.

The term "Journey log" may cover a journey log which is a one-way journey record based on the ticket. It may include information about the location of embankment, time/day of it, the location of alight, time/day of it, whether the ticket is used or unused, etc., which will also be discussed further The term "Smart contract" is generally known and Wikipedia, for example, explicates (https://en.wikipedia.org/wiki/Smart_contract): "A smart contract is a computer protocol intended to digitally facilitate, verify, or enforce the negotiation or performance of a contract. Smart contracts allow the performance of credible transactions without third parties. These transactions are trackable and irreversible. Smart contracts were first proposed by Nick Szabo, who coined the term, in 1994. Proponents of smart contracts claim that many kinds of contractual clauses may be made partially or fully self-executing, self-enforcing, or both. The aim of smart contracts is to provide security that is superior to traditional contract law and to reduce other transaction costs associated with contracting. Various cryptocurrencies have implemented types of smart contracts."

Smart-contract languages, which may be used in some embodiments without limiting the present disclosure in that regard are computer languages for describing smart contract in the blockchain and may run/execute on the virtual machine for blockchain. Additionally, there are various languages which may be used for it. For example, Ethereum project's Solidity team has developed the smart-contract language "Solidity".

The term "Blockchain Oracles" is understood in some embodiments in a sense as also disclosed under https://blog.apla.io/what-is-a-blockchain-oracle-2ccca433c026: "What is an oracle? According to various online dictionaries, an oracle can be defined as an "authoritative or wise expression or answer" or "a person or thing regarded as an infallible authority on something". In fact, dictionaries themselves can be regarded as oracles but what does this have to do with blockchains? What is a blockchain oracle?

To understand blockchain oracles the reader should first be familiar with blockchains and smart contracts. A smart contract is software code that runs on a blockchain network such as Ethereum or Apla and performs actions or tasks based on certain events. The most obvious example is sending a transaction on the Ethereum network where I provide the receiver's address and proof that I have and own the funds, to the network. If everything checks out, the network will 'transfer' the funds to the receiver." It is further explicated that for decentralized applications which need external data, such as the current weather temperature, the price of a stock or even the results of the FIFA World Cup finals, the question is how a smart contract, or, in other words, a piece of code on a blockchain, gets the information and in such cases oracles for blockchain applications may be used.

Moreover, "Oracles are trusted data sources or entities that provide information or sign claims about the state of the world for smart contracts. They are the link between real world events and the digital world of blockchain platforms. They don't make predictions about the future but report events from the past."

The term "Stateful/Stateless smart contract" is understood in some embodiments, as follows: Stateful means to keep an internal state in the blockchain. This is similar to a computer program including a loop process and may be suitable for describing complicated conditions. Stateless means to not keep the internal state in the blockchain. The process is straightforward. It is suitable to describe the simple conditions.

The term "Data integrity" may be understood as defined by Wikipedia (https://en.wikipedia.org/wiki/Data_integrity): "Data integrity is the maintenance of, and the assurance of the accuracy and consistency of, data over its entire life-cycle and is a critical aspect to the design, implementation and usage of any system which stores, processes, or retrieves data."

The term "Certificate authority (CA)" may be understood as defined by Wikipedia (https://en.wikipedia.org/wiki/Certificate_authority): "In cryptography, a certificate authority or certification authority (CA) is an entity that issues digital certificates. A digital certificate certifies the ownership of a public key by the named subject of the certificate. This allows others (relying parties) to rely upon signatures or on assertions made about the private key that corresponds to the certified public key. A CA acts as a trusted third party—trusted both by the subject (owner) of the certificate and by the party relying upon the certificate. The format of these certificates is specified by the X.509 standard."

The term "Spoofing" may be understood as defined by Wikipedia (https://en.wikipedia.org/wiki/Spoofing_attack#GPS_spoofing): "Spoofing—In the context of information security, and especially network security, a spoofing attack is a situation in which a person or program successfully masquerades as another by falsifying data, to gain an illegitimate advantage.
GPS/GNSS Spoofing A GPS spoofing attack attempts to deceive a GPS receiver by broadcasting incorrect GPS signals, structured to resemble a set of normal GPS signals, or by rebroadcasting genuine signals captured elsewhere or at a different time. These spoofed signals may be modified in such a way as to cause the receiver to estimate its position to be somewhere other than where it actually is, or to be located where it is but at a different time, as determined by the attacker. One common form of a GPS spoofing attack, commonly termed a carry-off attack, begins by broadcasting signals synchronized with the genuine signals observed by the target receiver. The power of the counterfeit signals is then gradually increased and drawn away from the genuine signals."

The term "Side-channel attack" may be understood as defined by Wikipedia (https://en.wikipedia.org/wiki/Side-channel_attack): "In computer security, a side-channel attack is any attack based on information gained from the implementation of a computer system, rather than weaknesses in the implemented algorithm itself (e.g. cryptanalysis and software bugs). Timing information, power consumption, electromagnetic leaks or even sound can provide an extra source of information, which can be exploited."

The term "Zero-knowledge proof/protocol" may be understood as defined by Wikipedia (https://en.wikipedia.org/wild/Zero-knowledge_proof): "In cryptography, a zero-knowledge proof or zero-knowledge protocol is a method by which one party (the prover) can prove to another party (the verifier) that they know a value x, without conveying any information apart from the fact that they know the value x. The essence of zero-knowledge proofs is that it is trivial to prove that one possesses knowledge of certain information by simply revealing it; the challenge is to prove such possession without revealing the information itself or any additional information."

In some embodiments, the following terminology related to cellular positioning involved:

UE based positioning: Observed Time Difference of Arrival (OTDOA), Cell ID based Network based positioning: Uplink-Time Difference of Arrival (UTDOA)

Location server in telecom network: Secure User Plane Location (SUPL) server, Enhanced Serving Mobile Location Center (E-SMLC)

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A communication network node for providing data to a distributed ledger, wherein the node comprises circuitry configured to perform at least one of:
provide verification of input data which is used as input to a smart contract,
provide verification whether output data, which is based on an output from a smart contract, is correctly received at a predetermined device.

(2) The communication network node of (1), wherein the input data are verified based on sensor data, the sensor data identifying a user.

(3) The communication network node of (2), wherein the sensor data are provided by at least one sensor included in a mobile terminal of the user.

(4) The communication network node of (2) or (3), wherein the sensor data are provided by at least one sensor detecting a user.

(5) The communication network node of anyone of (2) to (4), wherein the circuitry is further configured to provide a certification of the sensor providing the sensor data.

(6) The communication network node of anyone of (2) to (5), wherein the sensor data include location data or biometric data.

(7) The communication network node of (6), wherein the location data are transmitted to a location server for verification.

(8) The communication network node of (6) or (7), wherein the biometric data are transmitted to a biometric data server for verification.

(9) The communication network node of anyone of (1) to (8), wherein the circuitry is further configured to receive or transmit data based on a data integrity functionality.

(10) The communication network node of (9), wherein the data integrity functionality is based on at least one of: hash function, digital signature, block stream algorithm.

(11) The communication network node of anyone of (1) to (10), wherein the circuitry is further configured to transmit a trigger for causing execution of the smart contract.

(12) The communication network node of (11), wherein the trigger is transmitted in the case of a successful verification of the input data.

(13) The communication network node of anyone of (1) to (12), wherein the circuitry is further configured to perform binding between a user based identification and a mobile terminal based identification.

(14) The communication network node of (13), wherein the verification involves verification of the binding.

(15) The communication network node of (13) or (14), wherein the mobile terminal based identification includes at least one of cellular international mobile subscriber identity, cellular international mobile station equipment identity.

(16) The communication network node of anyone of (1) to (15), wherein circuitry is further configured to verify the authentication of a connected device.

(17) The communication network node of (16), wherein the authentication of the connected device is verified on the basis of at least one of: hash function based certification, standard base certification, manufacturer identification of the connected device, pre-configuration of the device, unique network or cellular identification associated with the connected device.

(18) The communication network node of anyone of (1) to (17), wherein the distributed ledger includes a blockchain.

(19) The communication network node of anyone of (1) to (18), wherein the distributed ledger includes data for mobility as a service.

(20) The communication network node of anyone of (1) to (19), wherein access to the distributed ledger is granted based on a permission right.

(21) The communication network node of (20), wherein the node is part of a consortium.

(22) A method for operating a smart contract, wherein the smart contract has at least two different states, the method comprising:

changing a state of the smart contract in response to receiving a trigger.

(23) The method of (22), wherein the at least two different states include at least one of: check-instate, check-out state, in-use state, unused state, cancelled state.

(24) The method of (22) or (23), wherein the trigger is received from a trusted network communication node.

(25) The method of anyone of (22) to (24), wherein the trigger is received from a trusted sensor.

(26) The method of anyone of (22) to (25), wherein the smart contract is executed in response to receiving the trigger.

(27) The method of (26), wherein the result of the execution of the smart contract depends on the state of the smart contract.

(28) A method for controlling a communication network comprising multiple nodes for providing a distributed ledger, the method comprising at least one of:

providing verification of input data which is used as input to a smart contract, providing verification whether output data, which is based on an output from a smart contract, is correctly received at a predetermined device.

(29) The method of (28), wherein the input data are verified based on sensor data, the sensor data identifying a user.

(30) The method of (29), wherein the sensor data are provided by at least one sensor included in a mobile terminal of the user.

(31) The method of (29) or (30), wherein the sensor data are provided by at least one sensor detecting a user.

(32) The method of anyone of (29) to (31), further comprising providing a certification of the sensor providing the sensor data.

(33) The method of anyone of (29) to (32), wherein the sensor data include location data or biometric data.

(34) The method of (33), further comprising transmitting the location data to a location server for verification.

(35) The method of (33) or (34), further comprising transmitting the biometric data to a biometric data server for verification.

(36) The method of anyone of (28) to (35), further comprising receiving or transmitting data based on a data integrity functionality.

(37) The method of (36), wherein the data integrity functionality is based on at least one of: hash function, digital signature, block stream algorithm.

(38) The method of anyone of (28) to (37), further comprising transmitting a trigger for causing execution of the smart contract.

(39) The method of (38), wherein the trigger is transmitted in the case of a successful verification of the input data.

(40) The method of (38) or (39), wherein the trigger is transmitted based on at least one of: user identification, location based detection of a user, biometric based detection of a user.

(41) The method of (40), wherein the location based detection involves checking the user's position based on location data provided by a device of the user and a network based positioning of the user.

(42) The method of (40) or (41), wherein the location based detection involves vision processing for identifying the user.

(43) The method of anyone of (28) to (42), further comprising performing binding between a user based identification and a mobile terminal based identification.

(44) The method of (43), wherein the verification involves verification of the binding.

(45) The method of (43) or (44), wherein the mobile terminal based identification includes at least one of cellular international mobile subscriber identity, cellular international mobile station equipment identity.

(46) The method of anyone of (28) to (45), further comprising verifying the authentication of a connected device.

(47) The method of (46), wherein the authentication of the connected device is verified on the basis of at least one of: hash function based certification, standard base certification, manufacturer identification of the connected device, pre-configuration of the device, unique network or cellular identification associated with the connected device.

(48) The method of anyone of (28) to (47), wherein the distributed ledger includes a blockchain.

(49) The method of anyone of (28) to (48), wherein the distributed ledger includes data for mobility as a service.

(50) The method of anyone of (28) to (49), wherein access to the distributed ledger is granted based on a permission right.

(51) The method of (50), wherein the nodes are part of a consortium.

(52) The method of anyone of (28) to (51), wherein the providing of verification is based on a risk that the smart contract can be tampered.

(53) The method of (52), wherein the verification can be omitted or restricted based on the risk.

(54) A mobile terminal for communicating with a network node for providing data to a distributed ledger, wherein the mobile terminal comprises circuitry configured to:
provide input data which is used as input to a smart contract.

(55) The mobile terminal of (54), further comprising at least one sensor, wherein the input data are provided on the basis of sensor data of the at least one sensor.

(56) The mobile terminal of (55), wherein the at least one sensor provides position data or biometric data.

(57) The mobile terminal of anyone of (54) to (56), wherein the circuitry is further configured to perform an application, the application configured to provide the input data to the network node.

(58) The mobile terminal of (57), wherein the application is a mobility as a service application.

(59) The mobile terminal of anyone of (54) to (58), wherein the mobile terminal is a smartphone.

(60) The mobile terminal of (57), wherein the application is configured to perform authentication of a user.

(61) The mobile terminal of anyone of (58) to (60), wherein the application is configured to determine a check-in of a user, based on sensor data provided by a sensor of the mobile terminal.

(62) The mobile terminal of anyone of (57) to (61), wherein the circuitry is further configured to perform binding between the mobile terminal and the application.

(63) The mobile terminal of (62), wherein the binding is performed on the basis of a certification.

(64) The mobile terminal of (62) or (63), wherein the certification is received from the network node.

The invention claimed is:

1. A communication network node for providing data to a distributed ledger, wherein the node comprises circuitry configured to:
bind a unique user-based identification and a mobile terminal based identification, wherein the unique user-based identification is a user account and the mobile terminal based identification is a plurality of unique cellular identifications selected by a user,
provide verification of input data which is used as input to a smart contract, wherein the input data are verified based on sensor data, the sensor data identifying a user,
in a case that the input data is verified, transmit a trigger for causing execution of a smart contract,
verify that a sensor providing the sensor data is an authentic data source without knowing the unique user-based identification based only on a certificate received from a terminal device that certifies the sensor providing the sensor data, and
provide verification whether output data, which is based on an output from the smart contract, is correctly received at a predetermined device, wherein the output data is a ticket state being open, in use, or closed based on a check-in event trigger changing the ticket state from open to in use or a check-out event trigger changing the ticket state from in use to closed.

2. The communication network node of claim 1, wherein the sensor data are provided by at least one sensor included in a mobile terminal of the user.

3. The communication network node of claim 1, wherein the sensor data are provided by at least one sensor detecting a user.

4. The communication network node of claim 1, wherein the sensor data include location data or biometric data.

5. The communication network node of claim 4, wherein the location data are transmitted to a location server for verification.

6. The communication network node of claim 4, wherein the biometric data are transmitted to a biometric data server for verification.

7. The communication network node of claim 1, wherein the circuitry is further configured to receive or transmit data based on a data integrity functionality.

8. The communication network node of claim 7, wherein the data integrity functionality is based on at least one of: hash function, digital signature, block stream algorithm.

9. The communication network node of claim 1, wherein the verification involves verification of the binding.

10. The communication network node of claim 1, wherein the mobile terminal based identification includes at least one of cellular international mobile subscriber identity, cellular international mobile station equipment identity.

11. The communication network node of claim 1, wherein circuitry is further configured to verify the authentication of a connected device.

12. The communication network node of claim 1, wherein the distributed ledger includes a blockchain.

13. The communication network node of claim 1, wherein the distributed ledger includes data for mobility as a service.

14. The communication network node of claim 1, periodically check a lost or stolen mobile terminal database for a status of a mobile terminal associated with the mobile terminal based identification.

15. The communication network node of claim 1, wherein the certificate is an X.509 certificate.

16. A method for operating a smart contract, wherein the smart contract has at least two different states, the method comprising:
binding a unique user-based identification and a mobile terminal based identification, wherein the unique user-based identification is a user account and the mobile terminal based identification is a plurality of unique cellular identifications selected by a user;
providing verification of input data which is used as input to the smart contract, wherein the input data are verified based on sensor data, the sensor data identifying a user;
in a case that the input data is verified, transmitting a trigger for causing execution of a smart contract;
verifying that a sensor providing the sensor data is an authentic data source without knowing the unique user-based identification based only on a certificate received from a terminal device that certifies the sensor providing the sensor data;
changing a state of the smart contract in response to receiving a trigger; and
providing verification whether output data, which is based on an output from a smart contract, is correctly received at a predetermined device, wherein the output data is a ticket state being open, in use, or closed based on a check-in event trigger changing the ticket state from open to in use or a check-out event trigger changing the ticket state from in use to closed.

17. The method of claim 16, wherein the trigger is received from a trusted network communication node.

18. The method of claim 16, wherein the trigger is received from a trusted sensor.

\* \* \* \* \*